Aug. 7, 1928.

A. H. PITNEY ET AL 1,680,113

PRINTING AND REGISTERING MECHANISM

Filed April 5, 1922      13 Sheets-Sheet 1

Aug. 7, 1928.  
A. H. PITNEY ET AL  
1,680,113  
PRINTING AND REGISTERING MECHANISM  
Filed April 5, 1922   13 Sheets-Sheet 4

Aug. 7, 1928. 1,680,113
A. H. PITNEY ET AL
PRINTING AND REGISTERING MECHANISM
Filed April 5, 1922 13 Sheets-Sheet 5

INVENTORS
Arthur H. Pitney and
Jacob W. Ogden By
Alexander & Dowell
Attorneys

Aug. 7, 1928.

A. H. PITNEY ET AL 1,680,113

PRINTING AND REGISTERING MECHANISM

Filed April 5, 1922   13 Sheets-Sheet 6

Inventors
Arthur H. Pitney
Jacob W. Ogden
By Alexander Trull
Attorneys

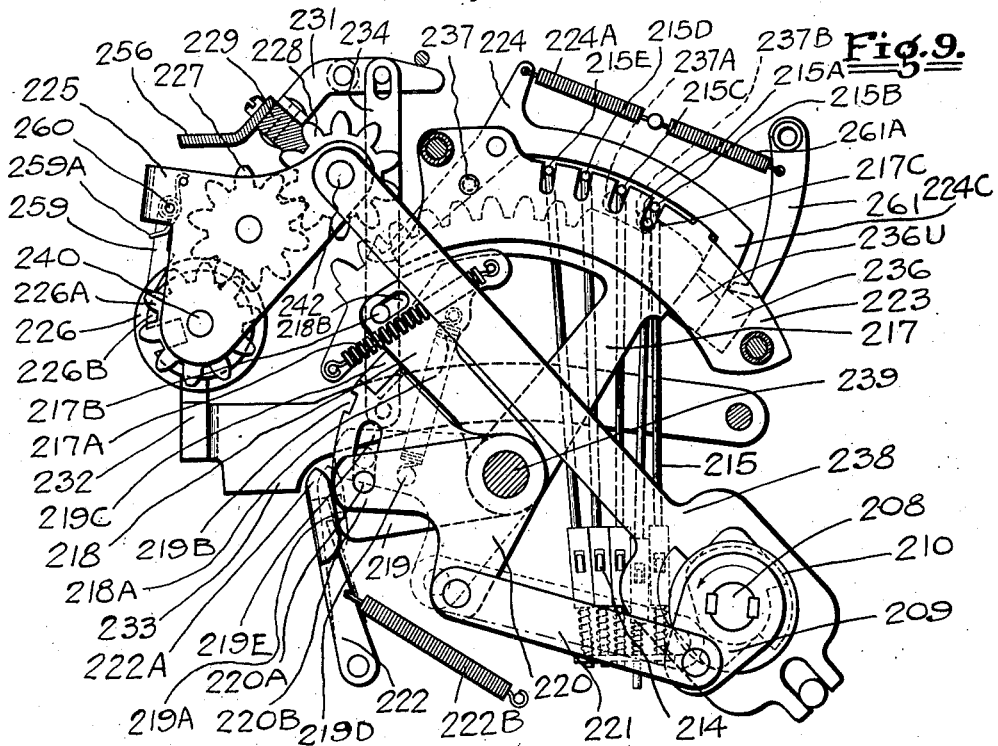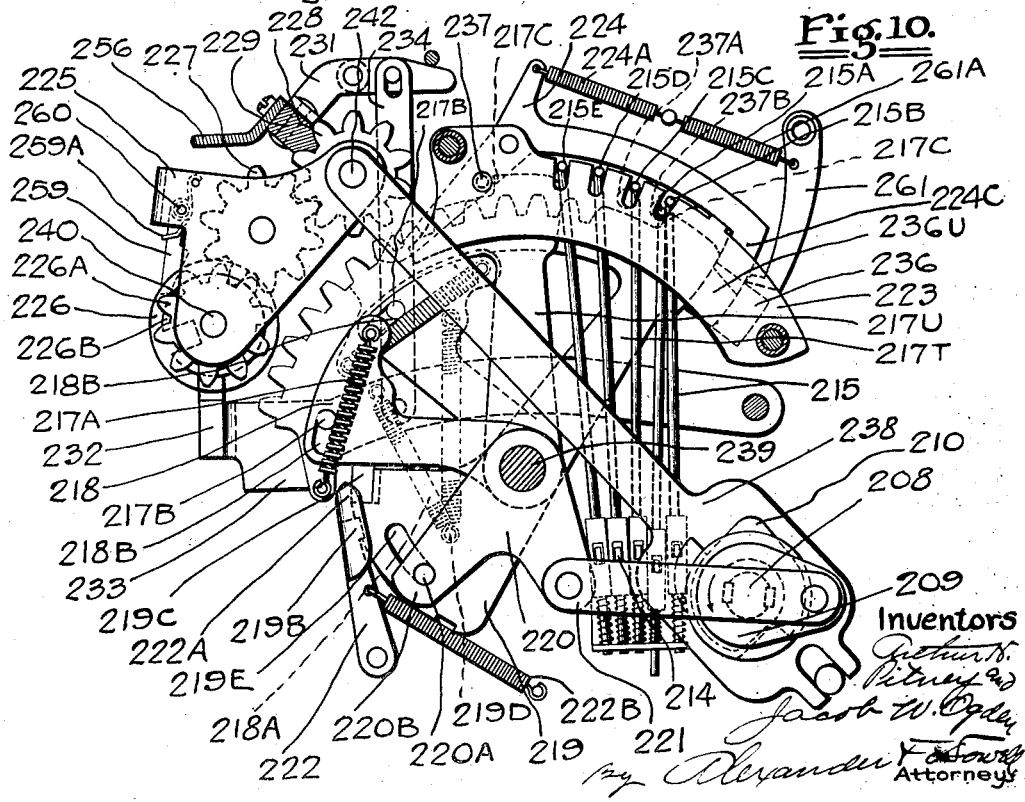

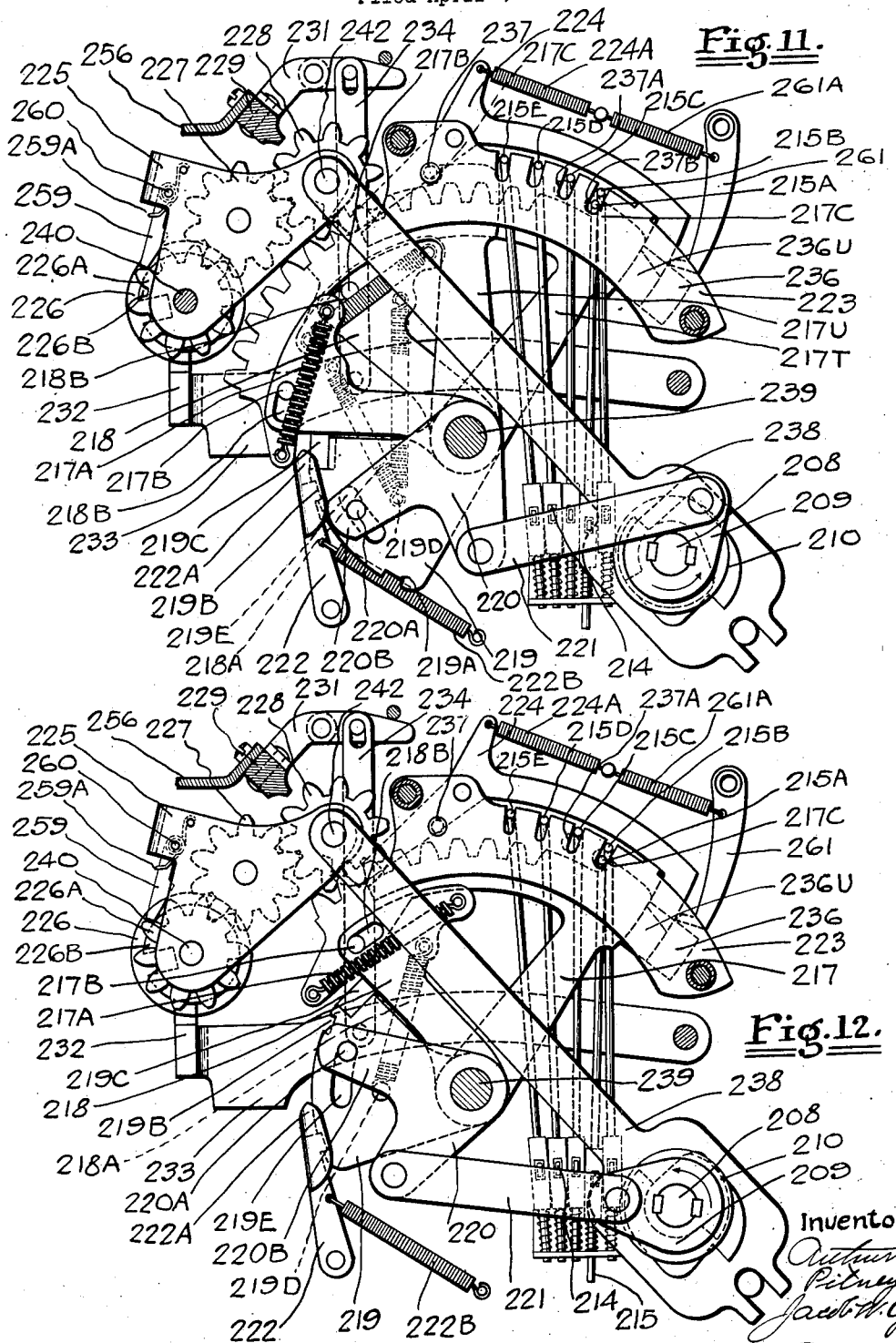

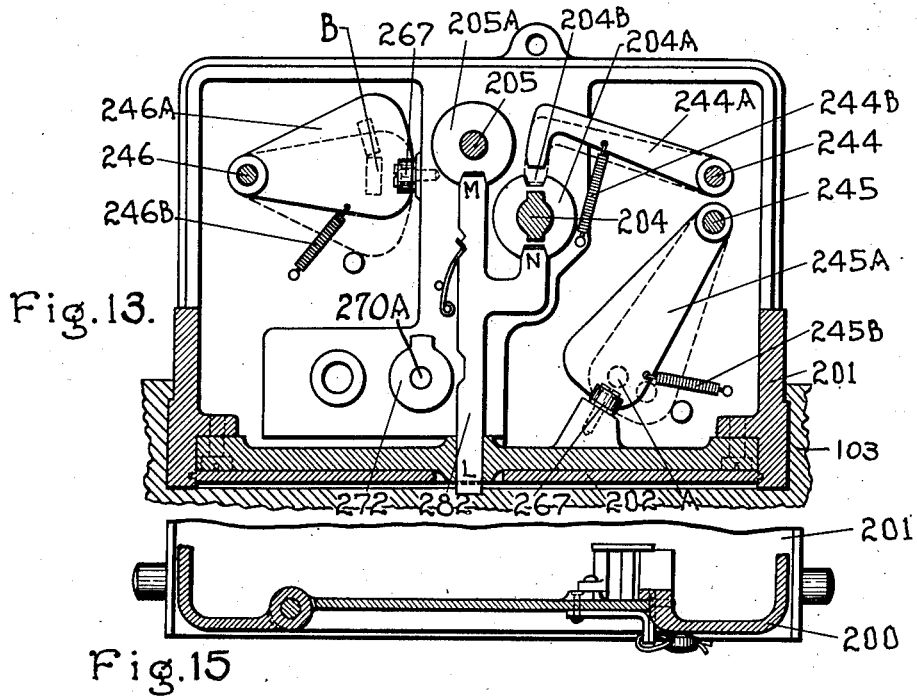
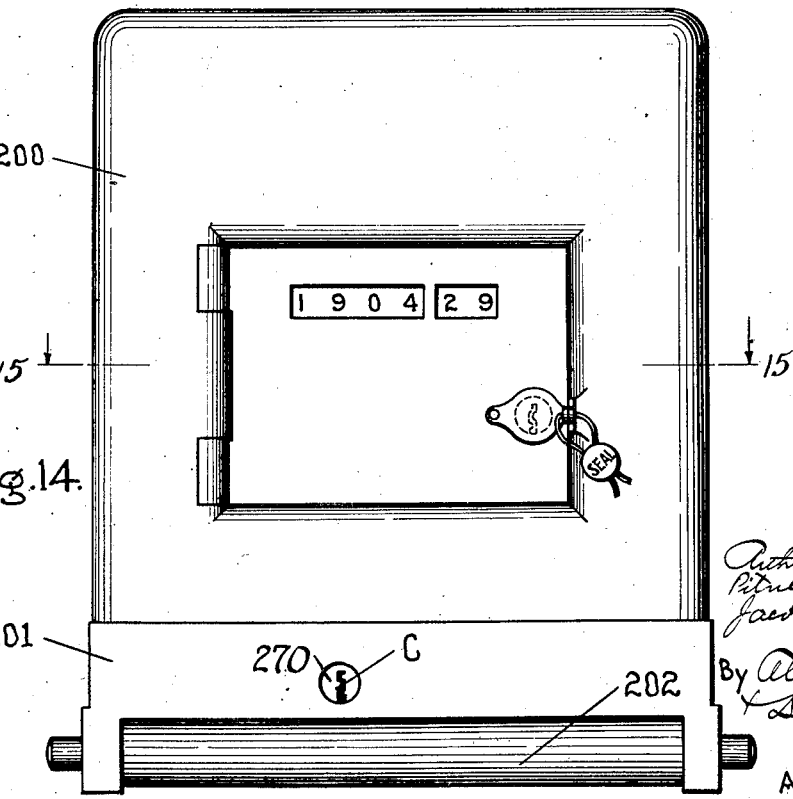

Aug. 7, 1928.
A. H. PITNEY ET AL
1,680,113
PRINTING AND REGISTERING MECHANISM
Filed April 5, 1922    13 Sheets-Sheet 10
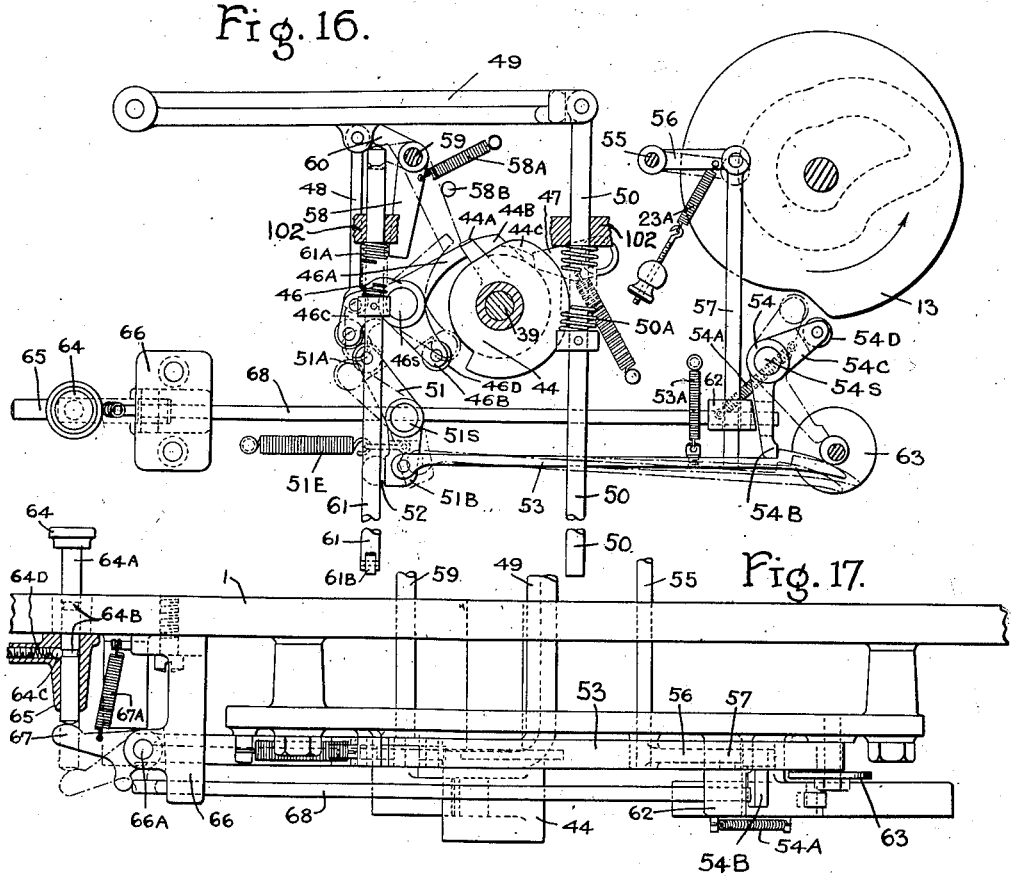
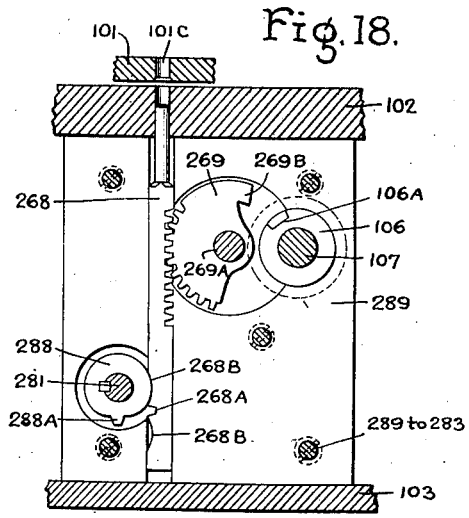
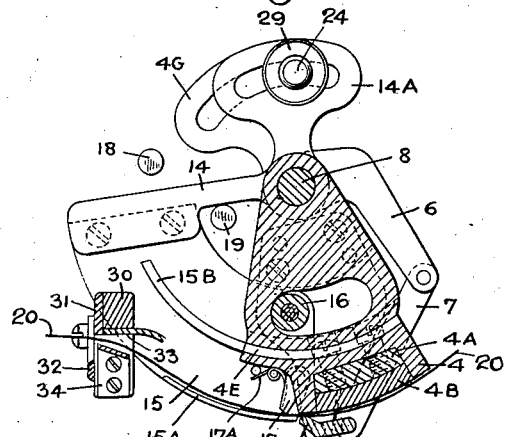

Aug. 7, 1928.
A. H. PITNEY ET AL
1,680,113
PRINTING AND REGISTERING MECHANISM
Filed April 5, 1922    13 Sheets-Sheet 11
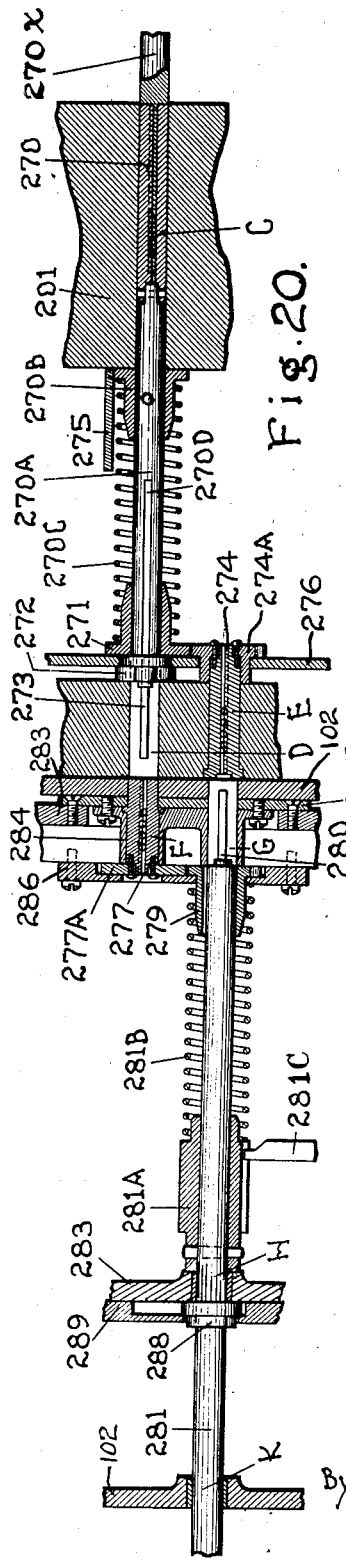
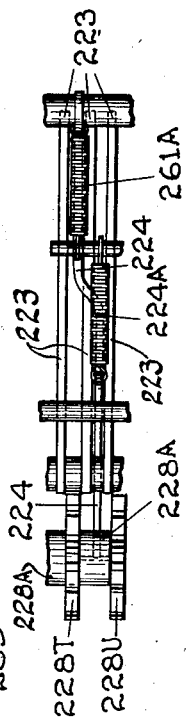
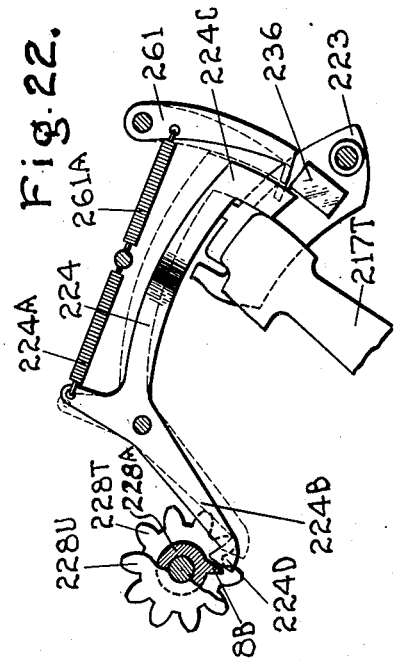
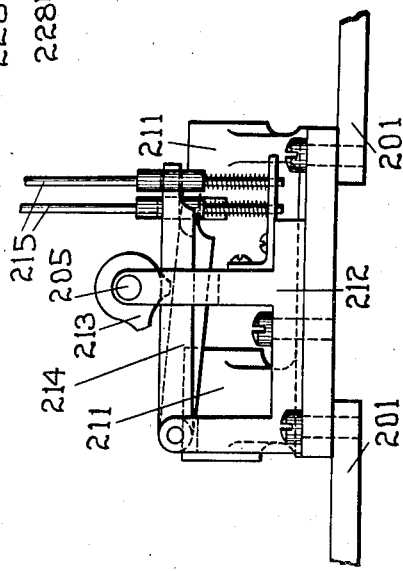
INVENTORS
Arthur H. Pitney
Jacob W. Ogden
BY
Alexander Powell
ATTORNEYS

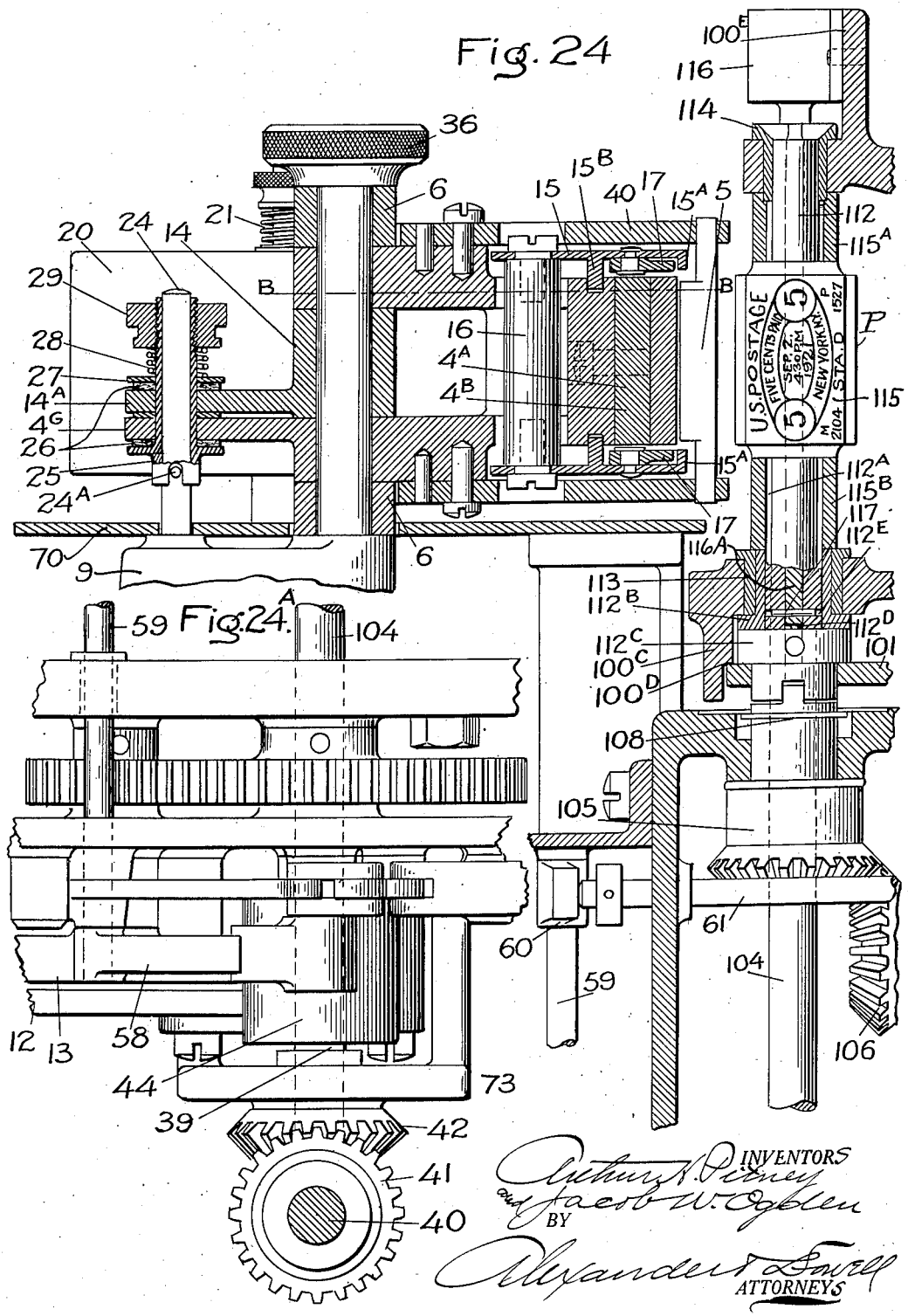

Aug. 7, 1928.
A. H. PITNEY ET AL
PRINTING AND REGISTERING MECHANISM
Filed April 5, 1922 13 Sheets-Sheet 13
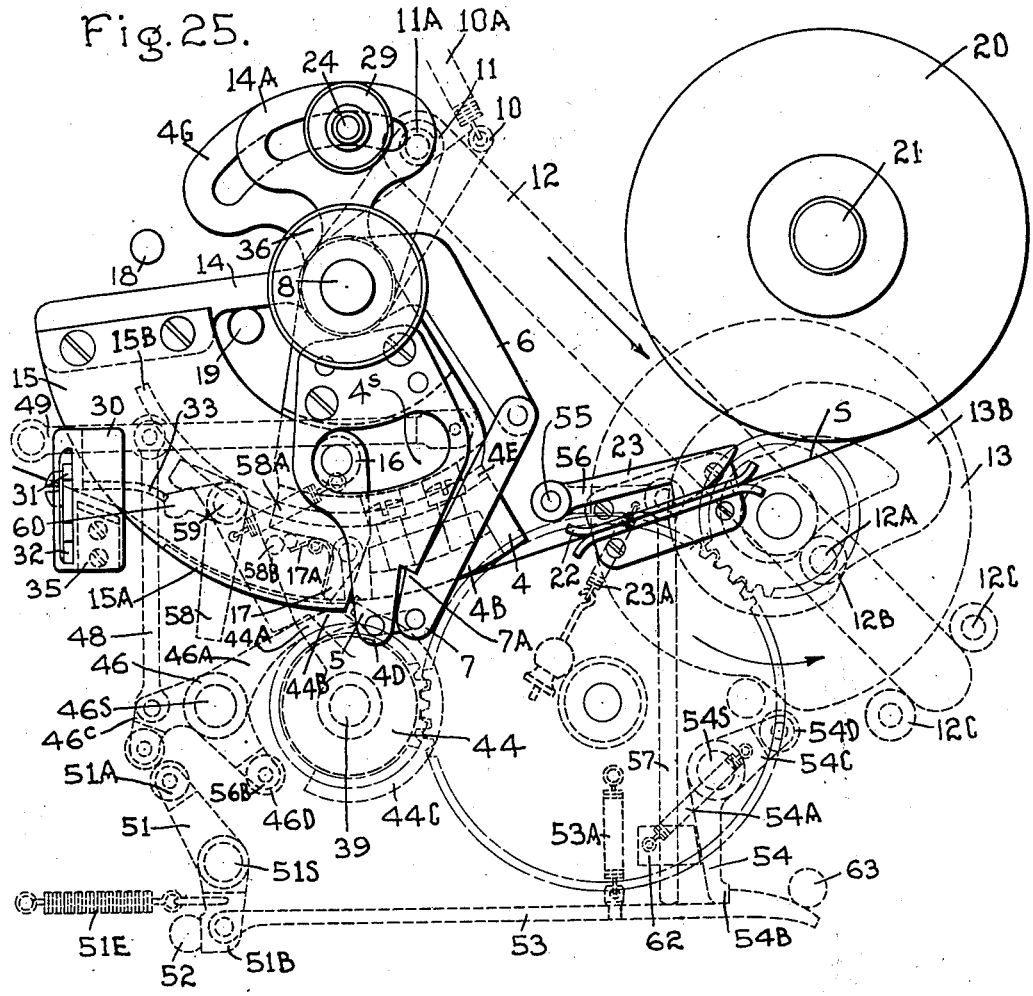
Fig. 25.
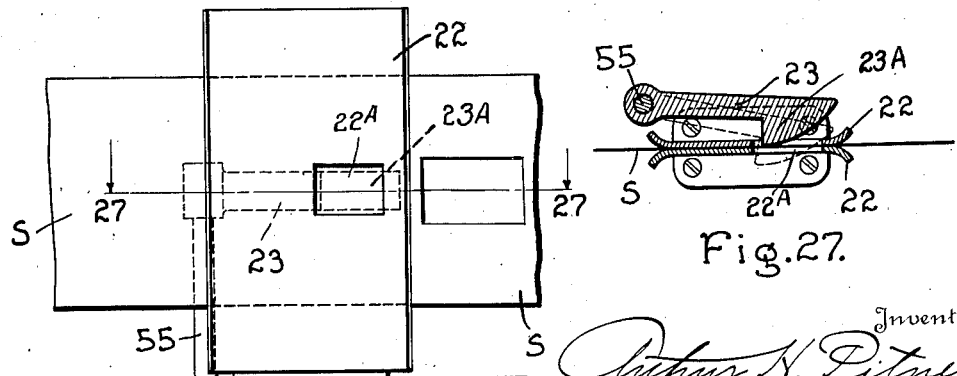
Fig. 26.
Fig. 27.
Inventors
Arthur H. Pitney
Jacob W. Ogden
By Alexander & Dowell
Attorneys Patented Aug. 7, 1928.

1,680,113

UNITED STATES PATENT OFFICE.

ARTHUR H. PITNEY AND JACOB W. OGDEN, OF STAMFORD, CONNECTICUT, ASSIGNORS, BY MESNE ASSIGNMENTS, TO PITNEY-BOWES POSTAGE METER COMPANY, OF STAMFORD, CONNECTICUT, A CORPORATION OF DELAWARE.

PRINTING AND REGISTERING MECHANISM.

Application filed April 5, 1922. Serial No. 549,734.

This invention is a machine designed for use by persons, firms or corporations having a great number of letters or packages to mail, to enable such users of the mail to buy any desired amount of prepaid postage from the Government, and print such amount of stamps by this machine in any quantities that they desire, from time to time, until the total amount of postage which they purchased is exhausted; at which time the machine will automatically become locked so that no further stamps can be printed thereby.

The complete machine embodies in brief a plurality of stamp printing members each of a different denomination any one of which may be brought into operative position at the will of the operator; an impression mechanism whereby impressions may be taken from the printer; mechanism for registering the total amount in dollars and cents of the stamps printed by any and all the printing members; and mechanism whereby the total money value of stamps that may be printed can be determined and when such number is reached further effective operation of the machine will be prevented; mechanisms for locking the registering mechanisms or meter when removed from the machine; mechanism for locking the printing and impression mechanisms when the meter is removed therefrom; safety locking devices whereby improper use of the machine is prevented; and other novel features, novel combinations and details of parts hereinafter set forth.

The invention provides means whereby the owner of the machine can detach the meter, take it to the post office and purchase any desired amount of postage, for which he pays, the postal authorities setting the meter so that when it is replaced in the machine the owner can print stamps of any denomination in the machine in any order or quantity desired by the owner, until stamps equaling in value the total amount of the postage paid for have been printed, and then the machine cannot print any more stamps until more postage is paid for and the meter reset.

The invention further provides means whereby any one of a plurality of stamps may be readily printed at the will of the owner or operator of the machine; and the denomination of the stamps printed thereby can be changed at will.

The invention further provides novel means whereby the money value of each stamp printed is automatically registered in the machine and the money amount of stamps used also totaled as each stamp is printed, in accordance with the denomination of the stamp printed, whether it be of higher or lower value; the registering being kept in dollars and cents, and not by mere numbers of operations of the machine. At the same time means are provided whereby the number of stamps printed by each stamping member may be individually registered if desired.

The invention further provides means whereby the balance of postage paid for but not used may be always readily determined. This means comprises a subtracting register which is set in the meter by the post office official at the time the stamps are purchased to show the amount of postage paid for; and which is automatically operated each time a stamp is printed so that the value of each and every stamp printed is automatically deducted until the amount is exhausted whereupon the machine is locked.

The invention also provides means whereby when the metering devices are removed from the machine for the purpose of purchasing postage and having the meter reset, the printing mechanism is rendered absolutely ineffective so that no stamps can be printed thereby while the meter is out of the machine.

The invention further provides means whereby the meter cannot be tampered with by unauthorized persons either when in the machine or when removed therefrom. The invention also provides means whereby the machine cannot be effectively operated until the meter is properly positioned therein, and whereby cheating the Government by unauthorized tampering with the registers or cheating the owners of the machine by unauthorized use thereof by employees, or attempts to use the machine without registering the value of the stamps used is prevented.

The invention further provides novel means for feeding a gummed strip of paper past the printing point to receive impressions from the printing die when the machine is in condition for operation.

The invention may be readily adapted to print the stamps directly upon the envelopes to be mailed, or to print the stamps upon strips of adhesive paper so that they can be attached and applied to the mail matter like an ordinary stamp.

The invention is not only designed and adapted for printing prepaid postage stamps of various denominations on mail matter or on gummed paper strips from which the stamps can be detached and attached to letters or packages requiring excess postage, or to packages to be sent by parcel post; it is also useful for printing postage stamps in the post offices; and would be particularly useful for small country post offices where such machines could be used to print the stamps for sale, up to a certain amount for which the postmaster may be bonded, and thus prevent the frequent robbery of stamps in such post offices. It would also be useful for installing at all the retail stamp windows in large city post offices; and particularly at the parcel post mailing departments of such post offices.

The invention is also readily adapted and capable of use as a machine for printing Government revenue stamps for medicines; and for printing theatre tickets, car tickets and the like, at the ticket selling offices.

The printing is preferably done in colors to make the difference in denomination more easily recognizable. The entire amount of postage required for any parcel may be printed on one piece of paper, the various denominations of stamps, in their proper color, printed side by side. The meter registers the amount of postage in dollars and cents instead of the number of impressions of each die. Its mechanism is an adaptation of the adding machine, different dies setting differing stops within the meter, each die on being revolved for printing registers its proper amount in cents in the total of the upper register, and subtracts a like amount from the lower register.

Like the Pitney postage meter now in use (Patent No. 1,370,668, March 8, 1921) a machine embodying the present invention can be "charged" or set for a predetermined amount and will be locked against further operation when that amount is exhausted.

The stamps printed by the machine should bear the name of the town, State and substation, denomination of stamp, permit and meter numbers, and day, hour and year of mailing in addition to the name and address of the mailer, which the postal regulations provide must be indicated in the corner of the envelope or on the label attached to the package to which the printed stamps are affixed to identify the mailer in case of counterfeit or fraudulent use of the meter. Each denomination of stamp can be and preferably is printed in a distinctive color, corresponding with that of the regulation postage stamps of same denomination; and each stamp printed being dated or postmarked precludes the possibility of its being salvaged and used again, as is possible with the so-called precancelled stamps now used.

We will explain the invention with reference to the accompanying drawings which illustrate one practical embodiment of the invention, which, however, is capable of changes in form, construction and combinations of parts within the scope of the invention. An understanding of said machine will enable others to adopt and use the invention for various purposes within the scope of the claims, which set forth the essentials of the invention and the novel features of construction and novel combinations of parts for all of which protection is desired.

In said drawings:

Figures 9, 10, 11 and 12 are detail views of the registering mechanism in the meter, showing the parts in various positions assumed during the registering operations;

Figure 13 is a detail view of the locking mechanism;

Figure 14 is a front view of the meter detached;

Figure 15 is a detail section on the line 15—15, Figure 14;

Figure 16 is an enlarged plan view (below the table, showing part of box casting, above the table, in section) showing the various tripping devices and locking mechanism controlling devices;

Figure 17 is a detail side view of the tripping mechanism;

Figure 18 is a detail view showing one of the safety locking devices;

Figure 19 is an enlarged detail sectional view through the paper feeding devices on the line 19—19 Fig. 3;

Figure 20 is an enlarged detail diagrammatic sectional view of the manually controlled interlocks between the printer and the meter;

Figures 21, 22 and 23 are detail views of part of the registering devices in the meter;

Figure 1:
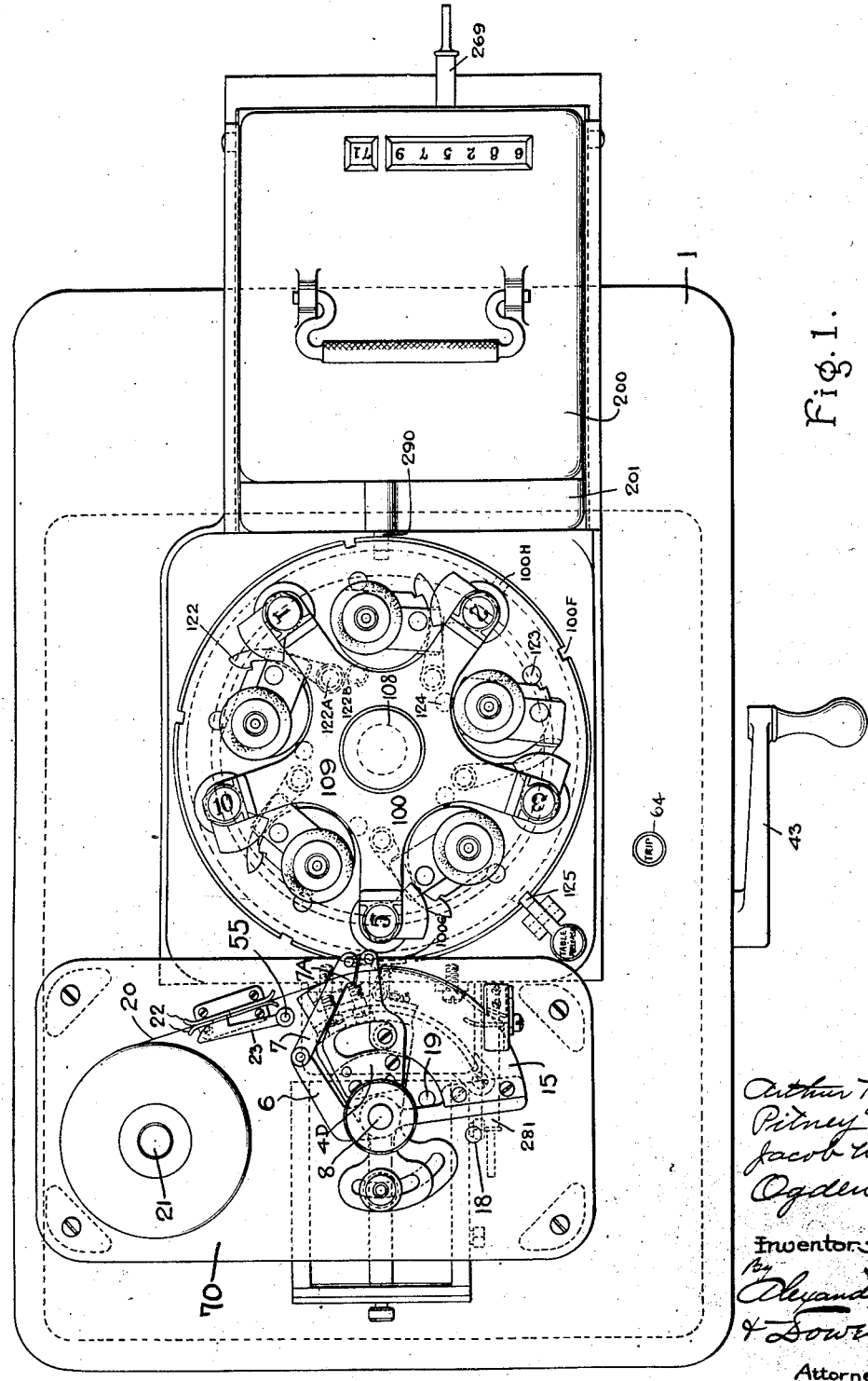
Figure 1 is a top view of the complete machine.

Figures 24 and 24^A show an enlarged sectional elevation of the printing member operating devices, and the impression member;

Figure 25 is a top plan view of the impression member, and shows the printing member and the controlling devices of the printing and impression members in dotted lines;

Figure 26 is a detail view of the paper guide;

Figure 27 is a detail section on the line 27—27, Fig. 26.

The machine as shown in the drawings comprises (1) a suitable base or support on which is mounted the printing means, comprising an adjustable stamp carrier containing a multiple of stamp carrying dies or members and means whereby any one of such members can be operated when properly positioned at the printing point; (2) means for feeding a strip of paper past the printing point; (3) a meter containing registering mechanism adapted to be operated by the mechanism which operates the stamp and paper feeding devices when the machine is in condition for operation, and to register the money value of the stamps printed by the machine, when the machine is adapted for use as a postage meter, in accordance with the value of the stamp printed.

The printing means and meter are mounted upon a base plate 103 which is fastened to a top 1 of a suitable hollow supporting member or trough 2 which is mounted upon a suitable floor stand 3 and supports the operative parts at about the height of an ordinary table in convenient position for manipulation by the operator. The meter 200 is also detachably attached to this plate 103 beside the printing mechanism as hereinafter explained. The paper feeding devices are mounted upon the top 1 in proper relation to the printing devices; and the main operating mechanisms and the trip devices controlling the operations of the machine are preferably arranged beneath the plate 1 within the member 2.

Figure 3:
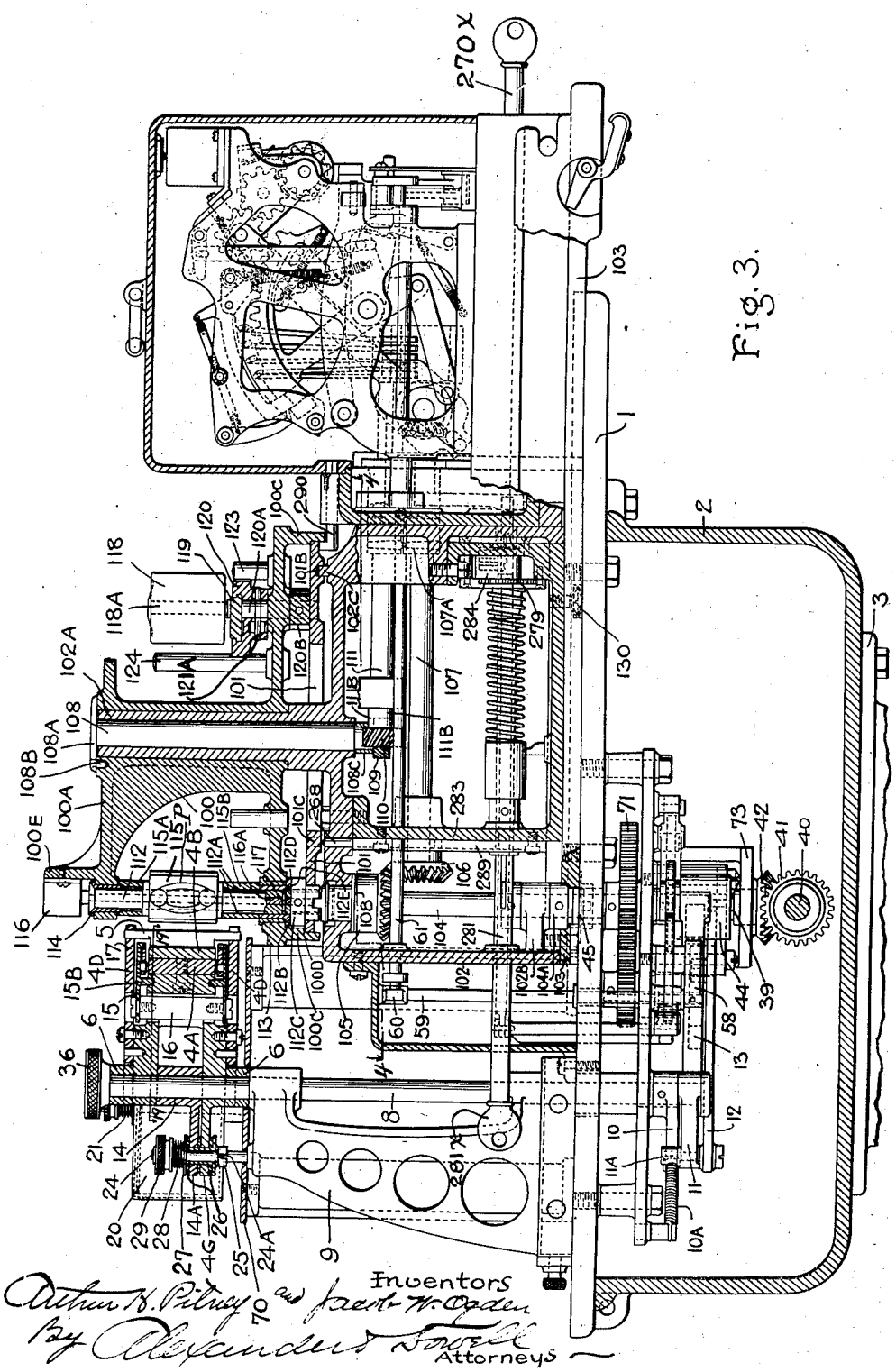
Figure 3 is a longitudinal sectional elevation of the machine.

The printing mechanisms are principally mounted on and in a boxlike casting 102, the open bottom side of which is completely closed by the plate 103, which plate projects a sufficient distance in front of the casting 102 to form a seat for the meter. The base plate 103 is secured to the casting 102 by screws and dowels and at least one of these screws 130, Fig. 3, is sealed so that no unauthorized person can remove it without leaving plain evidence of tampering. The whole unit after assembly is slid in ways planed in the table 1 and fastened by screws from underneath. The table 1 is locked by a padlock to the trough 2 so that it can only be lifted by the holder of the key, who should be a responsible person.

It is not intended that the printing means shall be frequently removed from the machine, but if on demand it should be necessary to check it up with its meter it will be easily detached, if mounted in a slide similar to the meter. Taking it off the machine does not give access to the internal mechanism however, for it is still sealed by one or more of bottom cover screws 130, above mentioned.

The printing devices.

In the construction shown in the drawings the printing mechanism comprises a plurality of printers or dies one for each denomination of stamp used in the machine mounted on a rotatable support. In the example shown there are 5 such printers (see Fig. 1) which are adapted to print stamps of the amounts 1¢, 2¢, 3¢, 5¢ and 10¢. These stamps are mounted on vertical spindles journaled in a rotatable member 100 which may be conveniently formed of suitable castings.

The part 100 (Fig. 3) carrying the printers or dies is fitted on a cylindrical standard 102^A rising from the top of the supporting casting or box 102 hereinafter more fully described.

The rotating member or head 100 is made in circular form at the bottom with over head arms 100^A carried by a central support 100^B which is bored to a running fit on the standard 102^A. The upper arms 100^A carry the upper bearings 114 of the die shafts 112. The lower circular part of the rotatable head 100 is hollowed out on its under side and the flange 100^C has a shoulder 100^D turned in it as a locating point for the plate 101 which is securely fastened to it by screws (not shown in the drawings).

The printers or dies P may be of any suitable kind. As shown they comprise a sleeve 115 having a radial projection on the peripheral face of which appears the desired printing surface; as indicated in the drawings (see Figs. 3 and 24). Each printer is mounted on a die shaft 112 which has projections or keys 112^A on its opposite sides. These keys are turned off at the upper end where the shaft is journalled in the upper bearing 114. A flanged sleeve 112^B fitting over and enclosing the keys, acts as a journal for the lower end of the shaft 112 and runs in the bearing 113. At the extreme lower end of the shaft 112 a flanged collar 112^C is securely pinned; its lower end passing through the plate 101 is slotted to fit the tongue of an "Oldham" coupling 108. The flanged upper end of the collar 112^C bears against the flange of the sleeve 112^B on one side and against the inner side of the plate 101 on the other preventing any vertical motion of the spindle 112. The printer die 115 is key slotted to fit the keys 112ᴬ on die shaft 112, and with the spacing collars 115ᴬ and 115ᴮ occupies all the space between the upper and lower bearings 114 and 113.

A circular projection or rib 102ᶜ is formed on the upper face of part 102 concentric with the standard 102ᴬ, and of a radius equal to the center distance of the shaft 112 from the standard 102ᴬ. Part of said projection is in line with the tongue of the "Oldham" coupling 108 and forms in effect a rigid continuation of the movable coupling, and said rib engages the slots of the collars 112ᶜ on all the die shafts 112 when they are not in printing position. This prevents the dies or printing members from being revolved on their own axes, when they are not in printing position, and it also keeps the slots in the collars 112ᶜ in position to correctly register with and make connection with the coupling 108 whenever required.

In the bottom of the plate 101 is a circular groove 101ᴮ to receive the projection 102ᶜ on the base 102. This groove is cut through at the points where the die spindles protrude through the plate 101, but the slots in the collars 112ᶜ aline with the groove and form therewith a continuous circular groove every part of which will be in engagement either with the rib 102ᶜ or with the tongue of the coupling member 108.

The object of this circular groove 101ᴮ and rib 102ᶜ is to lock the printing members or dies 115 when not in printing position and prevent their rotation, and also to lock the shaft 104 and prevent its being turned when no die is in printing position.

Each die or printing member is provided with suitable inking means, which may be of any suitable kind, but are preferably constructed as follows:

The inking roller 118 preferably made of felt is mounted on a stud 118ᵃ which is fastened to a plate 119 adjacent to each printer 115. Plate 119 is slidably mounted in a swivel block 120 which is fastened to the pivot 120ᴬ by the pin 121ᴬ. The pivot 120ᴬ passes through both the bottom of the rotating head 100 and the plate 101. A collar 120ᴮ is pinned to the pivot 120 between 100 and 101 and prevents vertical motion of pivot 120 but allows it to turn on its axis. A catch 122 (Fig. 1) is pivoted on the stud 122ᴬ and held against the piece 120 by the spring 122ᴮ, and holds the piece 120 in such a position that the ink roller 118 will be in line with the printing die 115. A gauge pin 124 is set in the floor of the rotating head 100 in such a position that will bring its surface, and the printing surface of the die 115, an equal distance from the center of the pivot 120ᴬ. The stud 123 limits the oscillating movement of the block 120 in both directions. In one position the roller 118 is in line with the die 115, and in the other the roller 118 is in line with the gauge pin 124. In Fig. 1, the ink roller located between the 2¢ and 3¢ dies is shown as swung around to line up with the gauge pin 124; this is the roller that inks the 2¢ die shown on the right. The method of and means for adjusting the ink roller and holding it fast after it has been adjusted, is described in Ogden Patent No. 1,390,156, September 6, 1921, and needs no further explanation herein.

Figure 2:
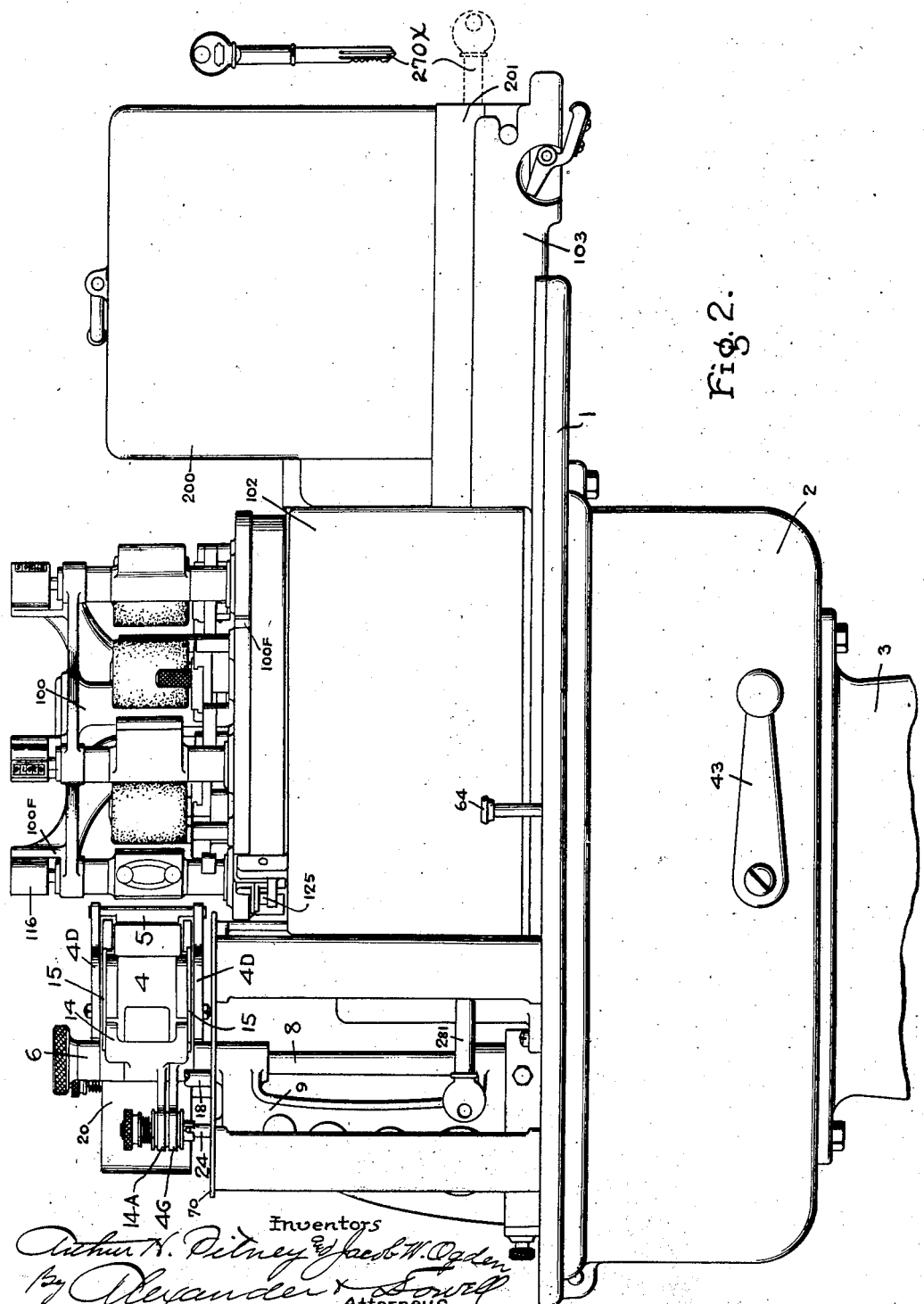
Figure 2 is a side elevation of Figure 1.

A spring catch 125, Figs. 1 and 2, is mounted on the case 102 and can be engaged in any one of the notches 100ᶠ cut on the rim of the rotating head 100, so that any one of the several dies may be correctly alined with the shaft 104 in the base or in printing position. There is one notch 100ᶠ for each printing member or die, and one extra notch 100ᴳ, Fig. 1, is provided and so located that when it is engaged by the catch 125, none of the dies will be in printing position. It is only when the head 100 is set in this neutral or ineffective printing position that the meter can be removed, as hereinafter described.

To bring any printer to printing position, the head 100 is turned until the clutch member 112ᶜ of the desired printer registers with the clutch member 108, as indicated in Fig. 3 and then it can be operated by power transmitted to such member 108.

As shown, member 108 is part of a so-called "Oldham" coupling, the other member of which is connected to the upper end of a shaft 104 vertically mounted within the box casting 102, said shaft being driven by mechanism below the table 1, as hereinafter explained.

The upper end of shaft 104 is larger in diameter where it is journaled in the upper part of the base casting 102 and its upper end is provided with a tongue to fit the "Oldham" coupling 108. Shaft 104 is journalled near its lower end in a bracket 102ᴮ in the box 102.

Figure 4:
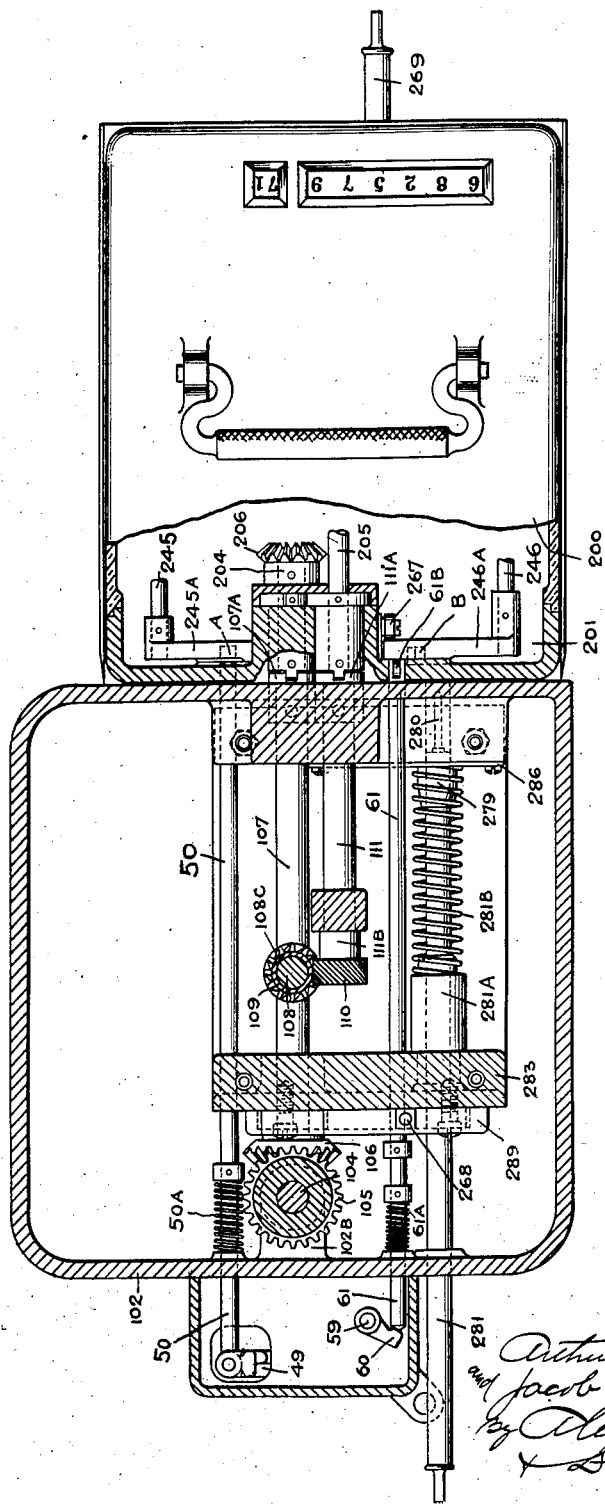
Figure 4 is a partial plan view and partial sectional view of the machine on the line 4—4, Figure 3.

A horizontal shaft 107 which is connected by the miter gears 105 and 106 to the vertical shaft 104, communicates the motion of shaft 104 to mechanism in the meter 200 as hereinafter described. A collar 107ᴬ, Fig. 4, is pinned fast to the end of shaft 107 and its end is grooved to fit a corresponding tongue cut in the end of the meter driving shaft 204 making the necessary coupling. A horizontal shaft 111 connected with the vertical shaft 108 by the helical gears 109 and 110 communicates the motion of shaft 108 to the indexing cam shaft 205 of the meter. A collar 111ᴬ, Fig. 4, pinned to end of shaft 111 similar to collar 107ᴬ on shaft 107 makes the necessary coupling. The helical gears 109 and 110 are keyed to their shafts and they have the same number of teeth so that any rotary motion of shaft 108 will cause shaft 111 to rotate in equal ratio with it. Spacing collars 108$^C$ and 111$^B$ are placed between the gears 109 and 110 and the bearings of their respective shafts.

A small counter 116 may be mounted on each overhead arm 100$^A$ of the rotating head 100 and operatively connected to the adjacent die spindle 112. It registers every revolution of the adjacent die and is introduced as a check on the meter. This counter is made with an extra long spindle 116$^A$ Fig. 24. The die shaft 112 has a hole 112$^D$ drilled through its entire length and a smaller cross hole 112$^E$ drilled near the bottom end at a point which is covered by the sleeve 112$^B$. The counter is securely fastened to the bracket 100$^E$ of the overhead arm 100$^A$ so that its spindle 116$^A$ passes through the hole 112$^D$ in shaft 112. A cross hole is drilled in counter spindle 116$^A$ in line with cross hole 112$^E$ of counter shaft. A small pin 117 is passed through both 112 and 116$^A$ which forces the spindle 116$^A$ to revolve with the shaft 112. The pin 117 cannot come out as the sleeve 112$^B$ surrounds the hole 112$^E$. The object of carrying this fastening down into the body of the mechanism is to make it impossible to break the connection without having access to the interior of the machine, and this is prevented by the locks.

The top or table 1 is hinged to the trough 2 which in turn is bolted to a suitable floor stand 3, Figs. 2 and 3. The trough 2 acts as a dust proof enclosure for various working parts and also as a support for the table. The table is hinged to it so that the parts may be easily accessible for lubrication, inspection, etc.

*The impression devices.*

Above the table 1 and suitably placed to produce impressions from the die that happens to be in printing position is mounted an impression member which may be of any suitable kind and construction, adapted to cooperate with the printer in making impressions when paper or mail matter, etc. is passed therebetween. As shown the impression member comprises a sector 4, Figs. 1, 2, 3, 19 and 25, which is provided with a recess in its outer face in which is secured a preferably rubber faced block 4$^A$, whose rubber face 4$^B$ is molded to conform to the circumference of the sector 4 and provides the resiliency necessary for producing a clear impression from the printing surface on the printer.

Projecting rearwardly from sector 4, is a shorter sector arm 4$^G$, having an arc shaped slot through which extends a friction member (described later) designed to prevent sector 4 moving too freely on the shaft 8. Securely fastened to the top and bottom of sector 4 (see Figs. 3 and 19 and 25) are two similarly formed plates 4$^D$, whose outer ends extend beyond the circumference of the sector 4 and afford a support and bearing for the paper feed clamp 5.

Loosely pivoted on the shaft 8 between the upper and lower sections of the sector 4 is an arm 14 (Figs. 3, 19 and 25) to the outer end of which are fastened two flat segmental plates 15, which are situated one over and one under the sector 4, which can move freely between them. A distance piece 16 is interposed between and fastened to the plates 15, and passes freely through a curved slot in sector 4. Each plate 15 has a curved tongue 15$^B$ on its inner face, which engages corresponding slots 4$^E$ in the top and bottom of the sector 4 and acts as guides for the travel of plates 15. Each plate 15 has a lip 15$^A$ (Fig. 24) on its outer edge projecting toward each other, and the radius of the inside surface of each lip 15$^A$ is very slightly greater than the radius of the sector 4. A clamp 17 shaped like a pawl is pivoted to each plate 15 and pressed against the inner side of the lip 15$^A$ by a spring 17$^A$. The stops 18 and 19 located on the shelf 70 limit the travel of the arm 14. Sector 4 is loosely mounted on a vertical shaft 8 which is supported by and has its bearing in a bracket 9 which is preferably adjustably fastened to the table 1, to enable the impression member to be adjusted toward or from the printer to regulate the impression pressure.

The shaft 8 extends through the table 1 and on the lower end of shaft 8 is fastened a lever arm 10 (see Figs. 3 and 25, and at the upper end of shaft 8 is also fastened by key and set screw a lever arm 6 which straddles the sector 4 at the shaft. At the outer end of the arm 6, are pivoted two links 7, Figs. 1 and 19 and 25, one above and one below the sector 4, which links lie in the same plane as the plates 4$^D$ of the sector 4. The outer ends of these links 7, are pivoted to the heel of the clamp 5, in such a way that any motion of the lever arm 6 relative to sector 4 will cause the clamp 5 to rock on its bearings in the plates 4$^D$.

The arm 14, has a rearwardly extending sector 14$^A$ which is slotted like the arm 4$^G$, and for the same purpose, both of them engaging the same friction member.

This friction member consists of a sleeve 25 (Figs. 3 and 24) loosely mounted on a stud 24 which is secured to the bracket 9. The sleeve 25 is flanged near its bottom end, and the top end is threaded for the tension adjustment nut 29, and that part of it below the flange is slotted to engage a pin 24$^A$, on stud 24 (Figs. 3 and 24), which prevents it from turning on the stud 24 when the nut 29 is turned. Both stud 24 and its sleeve 25 pass clear through the curved slots in the arms 4$^G$ and 14$^A$. Friction disks 26, of cork or leather, are placed on the sleeve 25, one between the flange on sleeve 25, and the arm 4$^G$, one between the arms 4$^G$ and 14$^A$ and one on top of the arm 14$^A$ between it and a steel disk 27. A spring 28 is interposed between the disk 27 and the nut 29 and forces the friction disks to bear on the faces of both the arms 4$^G$ and 14$^A$, giving the desired friction. The nut 29 makes it possible to vary the amount of resistance as required.

The machine shown is adapted to print stamps upon a strip of suitable material, preferably gummed paper. As shown (Figs. 1 and 25), a strip of paper S is led from a roll 20 loosely mounted on a stud 21 on cover 70, to and between two parallel guide plates 22 mounted on the said cover, and then led around the curved surface of the printer sector 4 and between such surface and the guide flanges 15$^a$ on the plates 15. The strip 20 is wide enough to fill the space between the plates 15 so that its edges are held by clamps 17 against the inner face of the flanges 15$^A$ while the body of the strip covers the face of the platen 4$^B$ of the sector 4. The plates 22 are formed with registering openings 22°, (Figs. 26 and 27) through which the head 23$^A$ of a detector lever 23 could project if not prevented by the pressure of the strip of paper S. The strip of paper between the plates normally holds the member 23 in the position shown in Figs. 1 and 25. This member 23$^A$ is attached to the upper end of a rod 55 hereinafter referred to. The head of lever 23 presses slightly against the strip S and acts as a drag or brake thereon which prevents the accumulation of slack in the strip between the plates 22 and the impression member or printing point. The lever 23 also serves as a safety device and trip for the purpose hereinafter explained.

On the lower end of shaft 8 (Figs 3, 24 and 25) directly below the lever arm 10, is loosely pivoted a lever arm 11 to the outer end of which arm is attached the link 12, which at its other end engages with the race cam 13. (Fig. 25.) The cam revolving in the direction of the arrow imparts a reciprocating motion to the arm 11. The arm 11 has a projection 11$^A$ on its end, adapted to engage the arm 10 and communicates its motion to it, when moved in the direction of the arrow. A spring 10$^A$ is connected to the arm 10 to effect its return with the arm 11.

The cam 13 is suitably geared to the drive of the printer and revolves in the same direction and at the same speed as the printer. The arms 10 and 6 on the shaft 8, being fast thereto, any movement of arm 10 will be communicated through shaft 8 to arm 6.

In printing a stamp the die makes one complete revolution and with it the cam 13. The rollers 12$^C$ (Fig. 25) prevent the link 12 from moving laterally, so that the pin 12$^A$ and roller 12$^B$ on the link 12 riding in the slot 13$^B$ of the revolving cam 13 forces link 12 to move in the direction of the arrow pulling the arms 11, and 10 with it. Arm 6 in moving pushes the links 7 and rocks the clamp 5 in towards the circumference of the impression member or sector 4 which is preferably slightly nicked to engage the clamp. Sector 4 because of the friction applied to the arm 4$^G$, remains at rest while the aforesaid movements of parts 6, 7 and 5 takes place. The gummed paper strip S lying between the clamps and the surface of the sector 4 is caught and clamped tightly therebetween. Continuing its forward motion the arm 6, through the pressure it exerts on the clamp 5 carries both sector 4 and tape 20 (or S) with it, the strip S slips forward past the clamps 17 and the die makes an imprint on the part of the strip S which lies over the rubber cushion 4$^B$. Before the sector 4 has completed its forward travel the end of its curved slot 4$^S$ therein engages the distance piece 16 of the plates 15 and carries them forward to the end of the stroke at which time the arm 14 rests against the stop 18. After the printing surface of the printer has cleared the sector 4, and while it is completing one revolution, the plates 5 and sector 4 are returned to first position.

At the beginning of the return movement, the sector 4 is held stationary by the friction member, and the arm 6 with the links 7 move back, the clamp 5 is first rocked out of engagement with the sector 4, releasing its hold on the strip S, which is held by the clamps 17. A hook 7$^A$ of the upper link 7 then engages a detent in the plate 4$^D$ and pulls said plate and the sector 4, back to the first position as at the start. On this return movement, the other end of slot 4$^S$ in sector 4 engages the distance piece 16 and returns the plates 15 to their original first position also. On the return movement of the plates 15, the part of the strip S, which is clamped to them by clamps 17, is moved back also. This backing up of the strip S shortens the blank space between the several impressions, and for this purpose the arm 14 and plates 15 are used. The contour of the cam slot 13$^B$ of cam 13 is such as to advance the impression member or sector 4 slowly, to near the point at which it engages the die, and from that point till a little after the engagement ends, the surface speed of the impression member or sector 4 is equal to the surface speed of the die. When this point is passed the remainder of the time of revolution is used to return the parts to their original position, the travel of the roller 12ᴮ of link 12 in making the steep descent in the cam slot 13ᴮ is assisted by the pull of the spring 10ᴬ.

The printing surface of the die will not interfere with the clamp 5 because it is moved out of the way at the time the die passes the point of contact with the sector. Clearance over and under the die is provided for the projecting parts 4ᴰ and 7.

Any suitable devices may be used for severing the printed stamp from the strip. As shown, Figs. 1 and 19, a pair of shears 31 and 32 is mounted on and between the guide plates 15 to cut the printed tape as desired. The fixed blade 31 is fastened to a block 30 rigidly secured to and between the plates 15. The movable blade 32 is hinged to block 30, and its upper end passes through a slot in plate 35, which is fastened on top of the upper plate 15. A back guide 33 is also fastened to block 30, and a front guide 34 is fastened to plate 35 to guide the tape between the blades of the shears, the cutting being effected by the operator moving the protruding end of the hinged blade 32 with his fingers.

As the last stamp printed on the strip lies between the shears and sector 4, it is necessary to rock the sector 4 by hand without printing another stamp, in order to feed the strip forward and to move the last imprint to the outside of the shears. To accomplish this a knurled knob 36 is securely fastened to the top end of the shaft 8 (Figs. 3–24) and by turning this knob, all the strip feeding operations above described as having been performed automatically by the driving action of the cam 13, can be done by hand, without moving the printer, and consequently without putting an imprint on the strip. This is because the lever 10 is free to move (in the direction of the arrow in Fig. 25) independently of the power derived from the positively driven lever 11.

In order to prevent an impression being made if there is no tape between the printing die and impression pad, the lever 23 which acts as a drag on the movements of the tape between the guide plates 22, is connected with the tripping mechanism (hereinafter described) below the table 1. The gummed strip S is usually fastened to the spool, and a rectangular hole—Fig. 26—is punched through the tape a proper distance from its inner end and when this punched part of the strip passes between the plates 22, the head of lever 23 will be able to project through the hole in the strip, and in so doing, it actuates devices which automatically renders the printing devices inoperative as hereinafter described. The hole in the tape should be made long enough to allow the completion of the printing of a stamp on a preceding part of the strip in the event the lever 23 projects through such hole at the beginning or during the course of a printing operation.

*The registering mechanism.*

It is essential when this invention is to be used for postage stamping or ticket selling machines and the like that the money value of all stamps or tickets printed thereby shall be registered and as these may vary in value (according to whichever stamp or printer is being used, and according to the number of impressions made from the various stamps or printers) it provides means for accurately registering the amount of each and any stamp printed, and for this purpose we have provided novel mechanism whereby the money value of each and every stamp printed is registered so that at any time the total money value of the stamps printed thereby can be determined. Furthermore we provide mechanism whereby when a predetermined money value of stamps has been printed the machine will be rendered ineffective and further printing operations prevented.

The registering mechanism is contained in what we term the meter; and in the preferred form of the machine this meter is bodily attachable to and detachable from the machine; and mechanism is provided whereby when the meter is properly positioned in the machine it is automatically operatively connected with the printing mechanism and will register the amount of each and every stamp printed no matter in what order or sequence the stamps are used or how frequently the stamps are changed in the machine.

And we also provide means whereby the meter is locked against tamperers when removed from the machine; also means whereby the printing mechanism is locked in inoperative condition when the meter is removed from the machine.

*The meter.*

Figure 6:
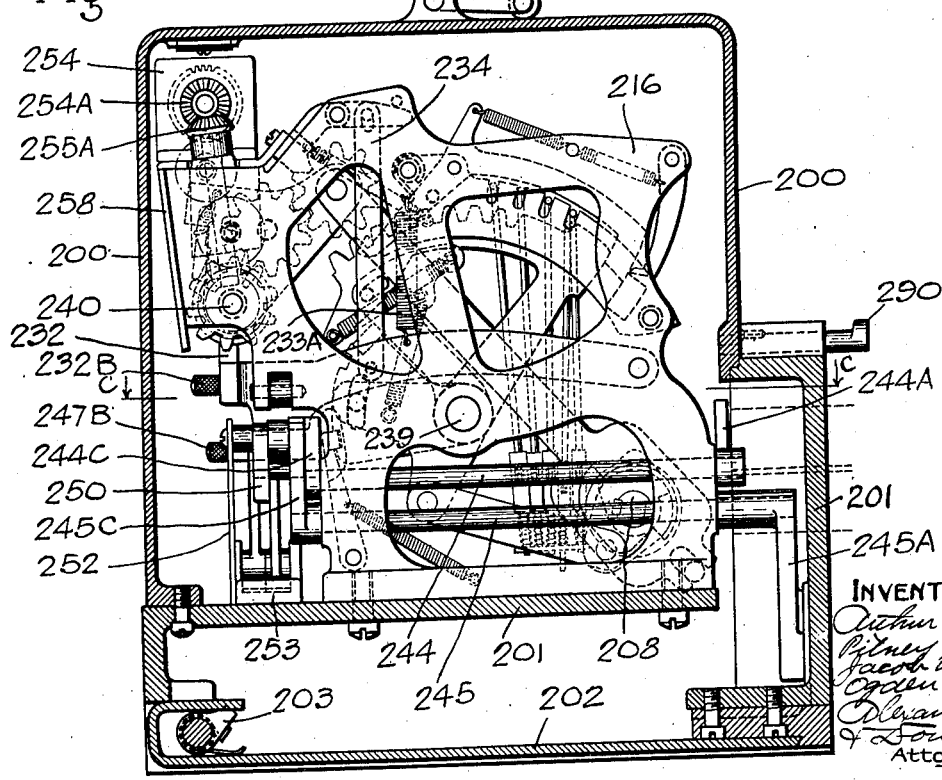
Figure 6 is a rear view of the meter with the casing cut away.

The meter consists of a counting mechanism, hereinafter described, mounted on a base 201 and enclosed in a case 200 (Figs. 1–4). The case is securely fastened to the base and the fastenings are covered by a sliding plate 202 (Fig. 6) which is locked in position by a spring latch 203 (Fig. 6). This latch is inaccessible and once snapped in place cannot be withdrawn without drilling through the plate 202, thus leaving unmistakable evidence of tampering with the meter.

Figure 5:
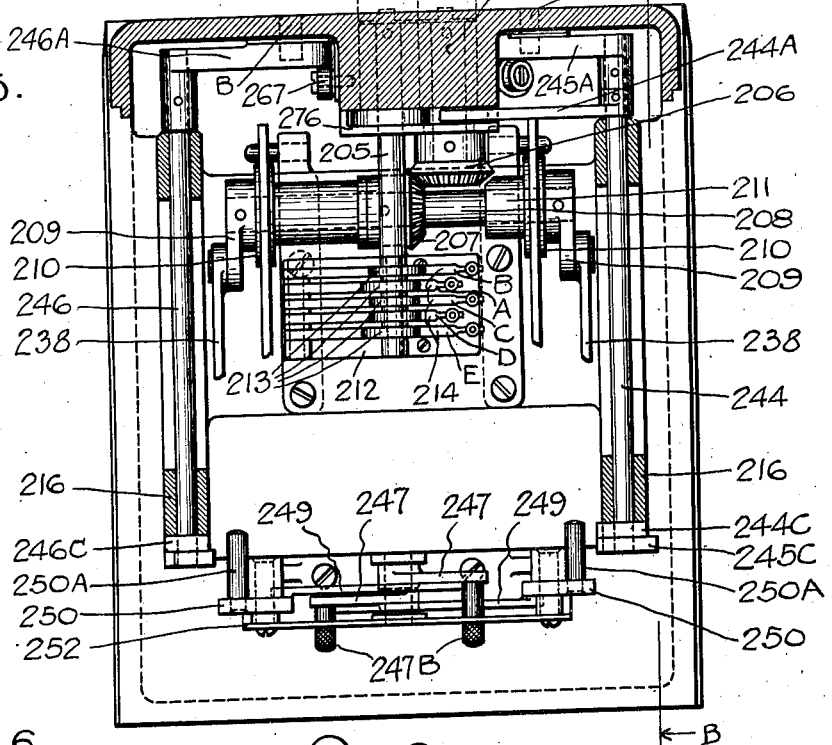
Figure 5 is an enlarged horizontal sectional view through the meter.

The working connections between the meter and machine include the meter drive shaft 204 driven by a shaft 107 in the machine and the meter cam shaft 205 driven by a shaft 111 in the machine (Figs. 3 and 4) as hereinafter explained. Inside the meter is a shaft 204 connected by miter gears 206 and 207 to shaft 208 (Fig. 5). Shaft 208 revolves in the bearing 211 which is fastened to the meter base casting 201. Shaft 208 is provided at each end with a crank 209 and a cam 210 and these cranks and cams acting in unison communicate all the necessary movement to the counter. The cam shaft 205 extends into the meter, its inner end having a bearing in an extension of the stand 212. (Figs. 5—21.)

A series of cams 213 (Figs. 5 and 21) are keyed to the cam shaft 205 and their function is to depress the stop levers 214 which in turn draw down into position the bent wire indexing stops 215 (Figs. 9, 10, 11, 12 and 21) which govern the downward motion of the racks that position the numbering wheels. The drive shaft 204 furnishes the motive power to the meter and the cam shaft 205 governs the amount it registers at each revolution.

The counting mechanism is mounted between two frames 216 (Figs. 7 and 8) and consists of the following parts: A series of gear toothed segments or racks 217, pivoted on a fixed spindle 239, supported by the frames 216, and slidable between guide plates 223 (Figs. 9 to 12) rigidly supported by the frames 216: a series of carrying levers 218, one for each rack are also pivoted on the spindle 239 and engaged by springs 218$^A$, one to each lever 218: a frame consisting of two side pieces 219 (Figs. 9 to 12) of sheet metal, one on each side of the nest of racks and levers connected by a rectangular rod 219$^C$ adapted to engage the levers 218 and lift them: a cylindrical rod 219$^D$ to which the ends of springs 218$^A$ are connected: bell cranks 220 (one on each side) to actuate the lifting frame 219: connecting rods 221 (between bell cranks 220 and cranks 209) : pawls 222 to engage notches in lifting frame 219: a series of guide plates 223 to guide the racks 217 and hold the indexing stops 215: a series of rocking back stops 224 (Fig. 22) connecting the numbering wheel of one order of figures with the controlling movement of the wheel of the next higher order of figures: a latch 261 to hold rocker 224 open till its mating rack is seated: a rigid back stop 236 limiting the backward travel of racks 217: a frame 225 (Figs. 9 to 12) containing the numeral wheels 226, the intermediate gear wheels 227, and the indexing gear wheels 228, pivoted to the frames 216 by the spindle 240: a connecting rod 238 between the driver shaft cams 210 and the spindle 242 of the frame 225: a fixed retaining stop 229 (Fig. 7) to hold the nonadjustable numeral wheel in position after indexing: a rocking retaining stop 230—Fig. 7— to do the same for the adjustable numeral wheels; a frame 231 to hold the rocking retaining stop 230: a locking bar 232 to engage with the locking cams 226$^B$ on numeral wheels 226: a rocking frame 233, to hold the lock bar 232: a link 234 connecting rocking frames 231 and 233: and a system of locks to be described separately later on.

The operative parts of the registering mechanism are shown in detail in various positions in the enlarged Figs. 5 to 12, inclusive, and 21 to 23, inclusive, of the drawings and it will facilitate an understanding thereof to explain the operation of the devices above referred to whereby the amount of postage which can be printed by the machine before it is locked is controlled by the meter.

*Operation of the counter registering mechanism.*

At the start of a cycle of operation, that is when the machine is at rest, the frame 225 containing the numeral wheels 226$^A$ is in its outer position as shown in Fig. 9 holding the indexing gear wheels 228 in mesh with the retaining stops 229 and 230 and clear of the racks 217, and the bell crank lever 220 is in the position shown by the dotted lines (Fig. 9).

In the several views submitted the rack stops (215$^A$ to 215$^E$) are set to register 5¢ (as a 5¢ die or printer is shown in printing position in Fig. 1). The zero indexing stop 215$^A$ is shown down for the "tens" rack, and all the movable indexing stops, 215$^B$, 215$^C$, 215$^D$ and 215$^E$ for the "units" rack are shown as cleared or "open". The indexing stop 237 for 5 on the units rack and the indexing stop 237$^A$ for 1 on the tens rack can be made rigid in this particular meter, as it is only built to register 5¢ as a maximum amount in units place, and 10¢ as the maximum amount in "tens" place. The stops for all the other racks 237$^B$ are placed at the zero mark as such racks are never indexed at all but simply carry forward as hereinafter explained the increment accumulated by the units and tens wheels.

When a registering operation begins the shaft 208 and crank on shaft revolves in the direction of the arrow in Fig. 9 and crank 209 pulls connecting rods 221 and bell cranks 220 with it. When the bell crank 220 arrives at the position indicated by the full lines in Fig. 9, its pin 220$^A$ has arrived at the end of slot 219$^E$ in lifting frame 219 and its long arm 220$^B$ has engaged the cam shaped end 222$^A$ of pawl 222 and pushed it out of notch 219$^A$ and thus released the lifting frame 219 which then moves with lever 220.

Each of the carrying levers 218, by reason of the connecting springs 218$^A$, will be caused to follow in the descent of the lifting frame 219 until they meet with an obstruction. In the instant case they will all be carried down till the end of the slot 218$^B$ engages the pin 217$^B$ of the rack 217; but all the racks except the "units" rack are stopped at zero, therefore, all the carrier levers 218 except the units rack carrier will be stopped in their downward movement by the pins 217<sup>B</sup>. The units rack however is free to move forward until the projection 217<sup>C</sup> is stopped by contact with the fixed indexing stop 237. The distance between the stop 237 and the zero indexing stop 215<sup>B</sup> is equal to 5 tooth spaces on the racks. Therefore the units rack has moved forward a space equal to 5 teeth, Fig. 10. The bell crank 220 continues on till the end of its stroke carrying with it the lifting frame 219 without any further effect on the movements of either carriers 219 or racks 217, the springs 218<sup>A</sup> extending to permit this. The bell crank 220 arriving at the end of its stroke brings the upper notch 219<sup>B</sup> of the lifting frame 219, to the point of engagement with the pawl 222, Fig. 10, which engages said notches and holds the frame 219 and with it the carriers 218 and rack 217, at rest in their extreme downward position (see Figure 10). While they are thus held, the revolution of the cam 210 on shaft 208 pulls the connecting rod 238, and rocks the numeral wheel frame 225 backward until the indexing gears 228 are in mesh with the racks 217 (see Fig. 11). During this operation the bell crank 220 has been moving on its return stroke, but it is necessary for its pin 220<sup>A</sup> to traverse the length of the slot 219<sup>B</sup> in the lifting frame 219, and its long arm 220<sup>B</sup> to disengage the pawl 222 in the same manner as described at the beginning of its downward stroke before any movement can be communicated to the frame 219. This disengagement is accomplished only after the indexing gears 228 are well seated in mesh with the racks. Then the upward movement of the lifter frame 219 is begun by pin 220<sup>A</sup> and as it progresses bar 219<sup>C</sup> lifts with it any of the carriers 218, and through them their respective racks, which it encounters on its way up, thus positively returning all the racks that have been moved (rocked forward) to their original position. In this case only one rack 217<sup>U</sup> (the units rack) was moved and as that was moved through a space equal to 5 tooth spaces, on its return said rack moves the indexing gear 228, 5 teeth, which movement is communicated to the numeral wheel 226 through the intermediate gear 227 (Fig. 12). At the moment this movement of the numeral wheel has been accomplished the tooth of pawl 222 drops into the lower notch 219<sup>A</sup> of the frame 219 and again arrests its movement (see Fig. 12), while the cam 210 on shaft 208, through rod 238, rocks the frame 225 back to its outer (forward) position, bringing the indexing gears 228 into mesh with the retaining stops 229 and 230, and clear of the rack teeth, and then completes the cycle of operations. This cycle is performed during one complete revolution of shaft 208 and all parts have performed a cycle of operations and are returned to the positions they had at the beginning, except that the unit indexing wheel (228) has been turned through an arc equaling 5 steps of its 10 divisions and produced a corresponding movement of its corresponding numeral wheel 226 subtracting a total of 5 units from the number declared on the register.

*The carry over.*

The "carry over" from one numeral wheel to the numeral wheel of the next higher denomination is preferably accomplished in the following manner.

Figure 7:
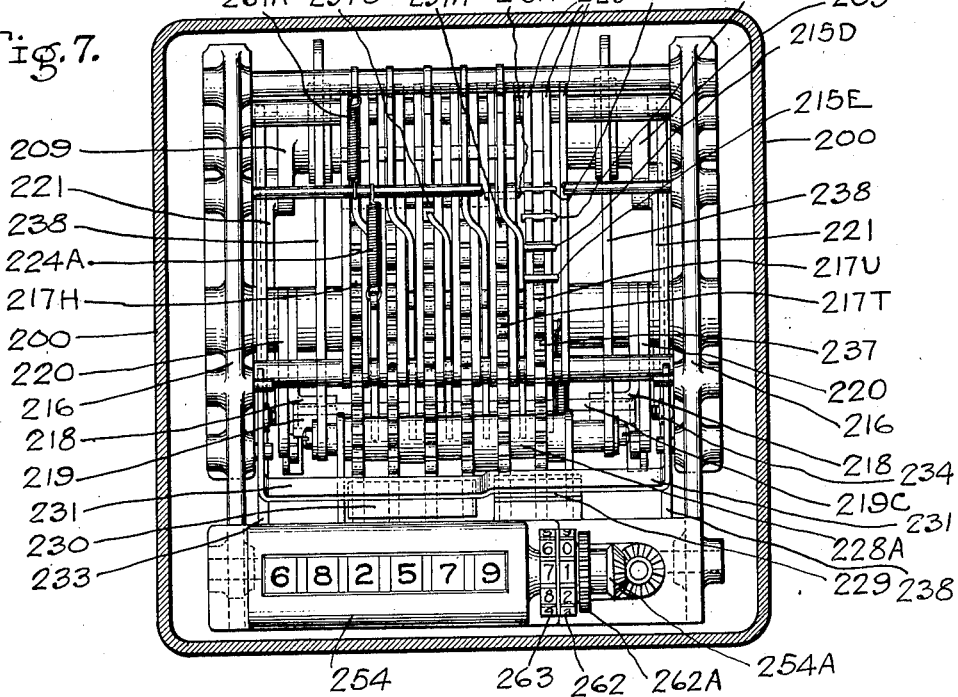
Figure 7 is a top plan view of the meter with the cover broken away.

At the rear end of every rack is a rigid back stop 236 (Fig. 22), one for each rack. In the case of the units rack 217<sup>U</sup> this back stop 236<sup>U</sup> (Figs. 9—10—11—12) limits the rearward movement of the rack 217<sup>U</sup>, to a place just sufficient to enable the bent wire indexing stop 215<sup>B</sup> (which corresponds to "zero") to engage the shoulder 217<sup>C</sup> on the units rack 217<sup>U</sup>. In the case of all the other racks "tens", 217<sup>T</sup>, "hundreds" 217<sup>H</sup>, etc., the related back stops 236<sup>T</sup>, 236<sup>H</sup>, etc., are placed the distance of one tooth space further back from the place where the shoulders 217<sup>C</sup> of the racks 217 engage the zero indexing stops, which leave a space equal to the pitch of the rack between the rigid back stop 236 and the end of the rack (see Fig. 22). This space is adapted to be filled by a movable rocking back stop 224. These rocking back stops 224, are shown as pivoted between two pairs of guides 223 (Figs. 9 to 12 and 23), their forward lever arms 224<sup>B</sup> (Fig. 22) projecting midway between each of the indexing gear wheels 228 their rearward arms 224<sup>C</sup> extending back and behind the rack of the next higher order. (Figs. 7, 22 and 23.)

At the other or forward end of the rack 217 is securely fastened a pin 217<sup>B</sup> which is free to slide in a slot 218<sup>B</sup> (Figs. 9 and 10), in the carrying levers 218. This slot is equal in length to one tooth space. A spring 217<sup>A</sup> connects both rack 217 and carrier 218 and continuously pulls on the rack urging it further back, and it is only prevented from taking this back position against the rigid back stop 236 by the interposition of the end of the rocking back stop lever 224. Each of the gears 228 has securely fastened to it, a hub 228<sup>A</sup> (Figs. 22—23) which projects on the side toward the adjacent indexing wheel of next higher denomination. The hub 228<sup>A</sup> is cylindrical for nine-tenths of its circumference—but the other one-tenth of its circumference is formed into an outwardly projecting ratchet tooth 228<sup>B</sup>, the inclined side of which is adapted to engage the projecting end 224ᴰ of the arm 224ᴮ of the related rocking back stop 224 and push it out of its path causing the rocking of the back stop lever 224, depressing its end 224ᴮ and raising the end 224ᶜ of said lever 224.

As this counting mechanism is designed to subtract instead of to add, the projection on the hub 228ᴬ is timed to trip the rocking back stop 224 at the instant when the numeral wheel being actuated is passing from "zero" to the figure 9; which is the next in order in the descending series.

The operation is as follows: On the return stroke of the lifting frame 219, the carriers 218 and the rack 217, the indexing gear 228 in mesh with the rack is revolving and if at any time during its revolution the "zero" character of the numeral wheel which it drives, passes the dial, the projection 228ᴮ on its hub rocks the related rocking back stop 224, to the position shown by dotted lines in Fig. 22, and a catch 261, urged by a spring 261ᴬ, engages the stop 224, and prevents it being immediately returned by its spring 224ᴬ. This withdrawal of the rocking back stop 224 leaves the related rack 217 free to move one space further back until arrested by the rigid stop 236 upon the completion of the upward stroke of the driving mechanism.

The lifting frame 219 will only move the racks back as far as their normal position (Fig. 9), but any one of the racks 217 (when its related back stop 224 permits) will be moved further back by a connected spring 217ᴬ until it is arrested by the fixed stop 236. When any rack 217 is moved back to the stop 236 its end will disengage the catch 261, and leave the rocking back stop 224 free to drop, again into normal position behind the rack at the next operation of the machine when all the racks 217 will be again moved as far forward as their related stops will permit.

The carrying over operation is distinct and independent of the indexing operation of the numeral wheels and is automatically accomplished as described.

As above stated when the present machine is used for printing stamps like the Pitney "postage meter" (Patent No. 1,370,668) it can be charged or set for a predetermined amount of postage and when that amount of postage has been printed is automatically locked against further operation.

In the present printer the multiple die meter may lock before the entire amount charged is used up and leave a balance due the user of the machine. The amount of this unused balance is governed by the price of the highest denomination of stamp in the nest of dies. The meter shown in these drawings is constructed to register stamps of 1¢, 2¢, 3¢, 5¢ and 10¢ denominations, and to lock when the tens wheel of the lower register reaches 0 the reading on the lower dial will then be 0000.09 or less after the last impression is made by the machine.

This means that any one of the stamps can be printed when the reading of the lower dial is as low as 0000.10 but that no more can be printed when it reaches 0000.09 or less. In other words, the machine automatically locks after the tens wheel reaches the position of 0. For instance if the lower register should read 0000.12 and the 10¢ die happened to be in printing position, one revolution would reduce the reading of the lower register to 0000.02 at which point the machine would lock, leaving the 2¢ as an unused balance to the credit of the user available upon the next setting. Again if the lower register read 0000.12 and the 5¢ die were in position, one revolution would reduce the reading of the lower register to 0000.07 at which point the machine would lock leaving a balance of 7¢ available at the next setting, etc. The idea being that the movement of the tens wheel controls the locking mechanism and is ready to automatically lock the machine the moment it reaches the position of 0 (regardless of how many figures may be on the units wheel) after the cycle of operation has been completed.

The unused balance indicated on the units wheel, cannot be altered by either accident or design after the mechanism has locked; neither can the figures be changed at the time subsequent settings are made, but will merely appear as that amount in excess of the new purchase. For instance if the machine locked at 0000.09 and $150.00 worth of stamps was required the reading of the lower register would be $150.09 all of which would be available before the machine locked again.

The registering mechanism just described is the one that shows on the lower dial of the machine and is called the descending register, because it subtracts the amount of the several stamps used, from the total for which the "meter" was charged. But there is another counter within the meter case which we call the ascending register and is read from the top of the meter case. This counter adds the amount of each stamp into a sum representing the total value of the stamps used. It also acts as a check on the first mentioned register.

*The "total" register.*

The total register 254 (Figs. 6, 7, 8) shows an ordinary Veeder revolution counter, to register dollars. (A revolution counter is one that requires one complete revolution of its spindle to count one unit.) This counter 254 is mounted on a plate 256 which is fastened at each end to the frames 216, and a supplementary two wheel counter 262 and 263 to register cents. This supplemental "cents" counter is essential to the proper working of the "dollar" counter because, as the tens and units wheel of the lower counter are independently indexed it follows that their complementary wheels in the upper counter should also be independently indexed. Therefore a separate train of gears is provided to connect the tens wheel of the lower with the tens wheel of the upper, and also the units wheel of the lower with the units wheel of the upper. This upper register is inaccessible to anyone; it cannot be reset at zero, and keeps on totaling the amounts used regardless of the various settings of the lower register. The following description will serve to make clear the mechanical connections between the two counters.

The shaft 240 forms the pivot upon which the numeral wheel frame 225 oscillates and also carries the numeral wheels 226, all of which except the tens wheel revolve freely upon it. (See Fig. 8.) The tens wheel is fastened to the shaft 240 preferably with a "Woodruff" key, Fig. 8, and revolves with it. The shaft 240 has its bearings in the frame 216, and is provided with a spacing collar 240$^B$ to hold frame 225 in position.

A miter gear 240$^A$ is pinned fast to the shaft 240 at one end of the frame 225 and revolves and communicates motion to a miter gear 255$^A$ on a vertical shaft 255, which revolves in a bearing 257 attached to the frame 216. Shaft 255 carries a miter gear 255$^A$ meshing with a gear 254$^A$ on an extension of the spindle 254$^S$ of the counter 254, and thence to the counter itself. Outside of counter 254 but securely fastened to its spindle is a numeral wheel 263 which constitutes the tens wheel of the supplemental or "cents" counter. This wheel by reason of its driving connection with the tens wheel of the lower counter moves in unison with it, and by reason of its connection with the spindle of counter 254, one complete revolution (or 10 tens of cents) of the lower register will cause registration of 1 unit or $1 on counter 254.

Again, the unit wheel 226$^U$, (Fig. 8) of the lower register instead of bearing directly on the spindle 240, is securely fastened to a sleeve 264 on the other end of which is fixed a spur gear 264$^A$. This sleeve 264 can revolve freely on the shaft 240 and extends through the hole in 225; the numeral wheel 226$^U$ within the frame, and the gear 264$^A$ outside. Upon the spindle of the upper counter 254, to the left of the numeral wheel 263, and freely revolving upon said spindle, is mounted a numeral wheel 262, which is fastened to a spur gear 262$^A$, and constitutes the unit wheel of the upper counter. Two intermediate gears 265 and 266 properly mounted on studs in the bearing piece 257, connect the gear 264$^A$ of the lower register unit wheel 226$^U$ with the gear 262$^A$ of upper counter unit wheel.

These two pairs of numeral wheels (namely the "units" of the counter and register and the "tens" of the counter and register) being geared together as has been shown, are originally set so that all four of the numeral wheels display "zero" at the openings in their respective dials, the figures engraved on the faces of the wheels in the counter being the arithmetical complements of those shown on the faces of the wheels in the register, in order in which they are exposed to view, and the sum obtained by adding the numbers displayed on the upper and lower numeral wheels (which numbers represent cents) will always be the same, namely 1.00.

There are two separate openings in the dial of the upper register completely segregating the "dollars" from the "cents." The reason for this wide space between, is because the supplemental or "cents" counter is outside the case of the dollar counter 254. It is an advantage however to have them thus separated. To produce a similar distinction in the lower register, the "cents" figures can be made of a different color from the "dollar" figures.

A sheet metal casing 258 (shown broken away in the drawing (Fig. 8) attached to the frame 216, encloses the gears connecting the counters at the place exposed by opening the door of the meter for recharging.

The set of pawls 259 (Figs. 8–12) pivoted at 260 in the case 225, and actuated by the springs 259$^A$ are provided to engage the tooth spaces of the gears 226$^A$ of such numeral wheels 226 as are designed to be reset. These pawls are not at all necessary for use in holding their respective numeral wheels in indexed position, but are only introduced as an alignment guide in resetting the figure wheels by hand. For this reason the springs 259$^A$ are made very light.

The means for automatically locking the operative parts of the meter and the printing mechanism, when the predetermined amount of postage has been printed is hereinafter explained. Assuming that the machine has been automatically locked in this manner it will become necessary to reset the meter and for this purpose the meter has to be removed from the machine and opened by the proper official in the proper manner. It may be reset ready for new operation as hereinafter described.

*Automatic locking of the meter.*

The locking of the machine against further operation when the predetermined amount of postage has been exhausted, is governed by the position of the numeral wheels as follows: Each figure wheel 226 is composed of three parts rigidly fastened together; namely a gear 226$^A$, by which it is driven, a body 226 suitably stamped or engraved for sight reading on the dial, and a cam or disk 226$^B$ (see Fig. 8), notched to receive the projections 232$^A$ on a locking bar 232. These notches in the disks 226$^B$ are so placed with reference to the numbers on the wheels 226 that they are in line with the projections 232$^A$ of the lock bar 232, when the cipher ("0") thereon appears at reading position. The disk 226$^B$ is omitted on the units wheel in the drawings as the unit wheel need not lock.

Figure 8:
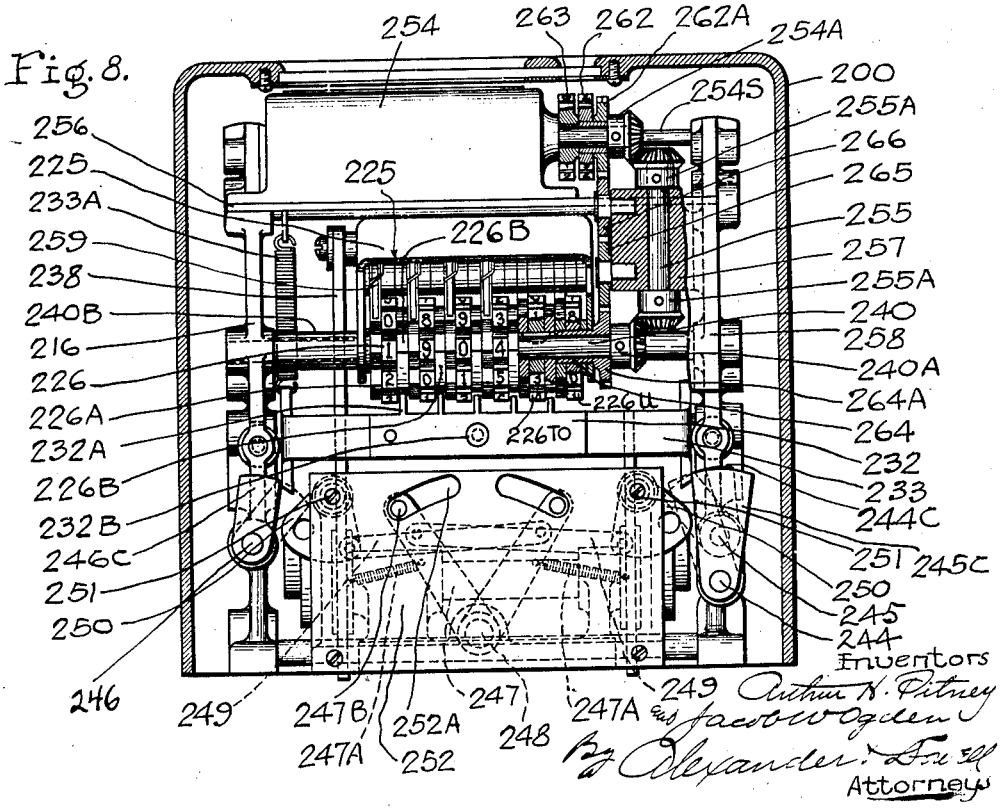
Figure 8 is a view of the meter with the face plate broken away, showing some of the interior parts in section.

There is one projection 232$^A$ on bar 232 for each wheel to the left of "units" place, and these projections progressively increase in length or height above the body of the bar 232, so that as the bar 232 and its frame 233 are pressed upward by the action of its spring 233$^A$, Fig. 8, the highest projection will make contact with disk 226$^B$ of the numeral wheel of the highest denomination in the set, thereby holding the other projections out of contact with their respective disks. By this arrangement, assuming that the meter is set for $9999.00 (as an illustration) when this number has been reduced by shifting the numeral wheels to 0999.99 the highest of the projections 232$^A$ will enter the notch in the related disk 226$^B$ of the numeral wheel registering "thousands" of dollars, but will only enter to the extent permitted by the difference in height between it and the next projection, which then bears on the disk 226$^B$ of the "hundreds" wheel. In like manner the second projection 232$^A$ will enter its mating disk when the dial reads 0099.99, as far as permitted by the third projection which then engages the disk on the "tens" wheel; thus the numeral wheels are necessarily locked at "0" portion until the reading is 0000.09 when the last projection enters its disk and the bar 232, meeting with no further resistance, makes full engagement with all the numeral wheels to be locked and rises to its full height, releasing the trip locking levers hereinafter described. The figure 9 on the units wheel, or any other figure that may happen to appear as showing the remainder when the meter is locked, cannot be used or changed; but shows the unused balance previously referred to.

The meter resetting devices.

Directly under the locking bar 232 is mounted a system of levers (Figs. 5—6—8) designed to facilitate the process of resetting or charging the meter. These levers are mounted on a frame 253 which is covered by a plate 252. Levers 250 one on the right and one on the left are pivoted at 251 and are each provided with a rearwardly projecting pin 250$^A$ sufficiently long to engage the levers 244$^C$, 245$^C$ and 246$^C$. Another pair of levers 247 are both pivoted at 248 and extending upward are provided each with a knurled knob or pin—247$^B$, which projects forward through slots 252$^A$ in plate 252. This pair of levers 247 are normally held apart by action of the springs 247$^A$ and are connected by links 249 to the levers 250 on opposite sides, that is, the 247 on the right operates the 250 on the left and vice versa.

When the meter is discharged the levers 244$^C$, 245$^C$ and 246$^C$ will be in position shown by dotted lines in Fig. 8, and it will be necessary to push them back out of the way in order to lower the locking bar 232 thereby releasing the numeral wheels for resetting. This is done by drawing the knobs 247$^B$ toward each other with the thumb and finger. The levers 250 will then by reason of their connection with levers 247 be rocked outward, and their projecting pins 250$^A$ will restore the levers 244$^C$, 245$^C$ and 246$^C$ to the positions shown in full lines in Fig. 8.

Downward pressure on the knob 232$^B$ of the lock bar 232 will then free the numeral wheels and the pressure on the two knobs 247$^B$ can be relaxed. In resetting the wheels it will be necessary to lower the lock bar 232 more than just enough to clear the projections 232$^A$ from the slots in the disks 226$^B$. The reason for this is that when the meter is at rest the indexing gears 228 are away from the racks and are held in position by the retaining stops 229 and 230. The stop 229 is fixed and only engages the units and tens wheels which cannot be altered, but the stop 230 which holds all the other wheels is mounted on a rocking frame 231 and this frame must be rocked out of the way. This is accomplished by continuing the downward movement of the lock bar 232 with its frame and then the link 234 which is pivoted to the lock bar frame 233 will rock the frame 231 and free the indexing gears 228 (see Figs. 9 to 12). The elongated slot in the upper end of the link 234 permits the lock bar 232 to rest on the face of the disks 226$^B$ and also to rise in the process of locking the wheels, but any added downward motion is communicated to the index stop 230.

Means for controlling the operation of the meter.

In the base casting of the meter at the back where it connects with that part of the machine containing the printers or dies, are two openings located at A and B, Fig. 13. These openings are for the entrance of rods, 50 and 61 (Fig. 4); the one 50 located at A, is required to enter the opening at the beginning of every operation of the machine, and is again withdrawn before the close of the operation. The other rod 61 located opposite the opening at B, continually endeavors to enter the meter and if it does enter the trip will be rendered inoperative. For convenience we will refer to the former 50 as the "positive" trip rod, and the latter 61 as the "negative" trip rod.

In addition a bolt 244$^A$ is provided to engage a slot in the flanged sleeve 204$^A$ on the drive shaft 204 to prevent it from turning. In order that the meter may properly function it will be necessary to keep the opening at A always open, the one at B always closed, and the bolt always out of engagement with the slotted flange, while the meter is charged, and a reversal of these conditions, or any one of them will render the meter inoperative. The locking bar 232 is the controlling factor for these three mechanical functions and operates through the following parts: (See Figs. 5, 6, 8 and 13.)

At the units or right hand side of the counting machine are two horizontal spindles 244 and 245 one above the other turning in bearings in the frame 216, and on the left hand side there is one spindle 246 similarly mounted in the frame 216. These three spindles extend through to the front of the meter. On each end of each of these spindles a lever arm is securely fastened so as to oscillate with it. Of these lever arms at the rear end, the one marked 244$^A$ on spindle 244 (Figs. 6 and 13) is shaped at its outer end in the form of a bolt, and under the tension of its spring 244$^B$ is normally pulled downward to engage the slot 204$^B$ in the flange 204$^A$ which is keyed to the drive shaft 204. It is prevented from thus dropping by the lever arm 244$^C$ fastened to the forward end of the spindle 244, and held up by contact with the side of the lock lever frame 233, (Fig. 8.)

The rear lever arm 245$^A$ fastened to spindle 245 extends downward and acts as a shutter to close the opening at A. (Figs. 6 and 13.) In this shutter 245$^A$ a depression or blind hole is drilled in line with the opening A deep enough to permit a substantial entrance of the end of the positive trip rod 50. The spring 245$^B$ normally pulls the lever 245$^A$ to a position where the depression will be out of line with the opening A and thus prevent the entrance of the positive trip rod 50 but is prevented from so doing by the forwardly placed lever 245$^C$ (Figs. 6 and 8) which is held up by contact with the frame 233.

On the other side of the counter the rear lever 246$^A$ is similarly formed as a shutter for the opening at B with this difference that the depression in 246$^A$ is not in line with opening B but is placed so that the rocking caused by its spring 246$^B$ will pull it into line, but as in the case of the other two levers it is prevented from doing so by its forward lever arm 246$^C$ (Figs. 5 and 8) bearing on the lock bar frame 233.

This locking bar 232 and frame 233 thus normally holds all three of these levers 244$^A$, 245$^A$ and 246$^A$ in a position other than they would occupy if controlled only by the action of their respective springs, and when it rises to its full height, thereby releasing them, they will shift to their normal position which will first drop the catch 244$^A$ ready for engaging the slot 204$^B$ in 204$^A$, second, close the opening at A for positive trip rod 50, and third, remove the shutter from the opening at B, allowing the negative rod 61 to enter.

The small rollers 267 suitably mounted in front of lever arms 245$^A$ and 246$^A$ are designed to relieve them of the thrust of the positive and negative trip rods.

*The meter locks.*

In addition to the automatic locking devices already described, the meter is provided with a system of "pin tumbler", key-operated locks: (Figs. 14 and 20) the primary object of which is to prevent any movement of its internal mechanism when it is detached from the machine, and also to prevent any movement of the printing dies in the machine unless the meter is in position to register such movement. Two separate locks have been provided, one in the printer carrier base and one in the meter. Neither of these locks can be operated independently of the other. They must cooperate through an interchange of keys; the key for the machine lock being incorporated in the meter, while the key for the meter is incorporated in the machine; and they must be in juxtaposition in order to function one with the other.

The construction of the meter lock is shown in Figs. 3, 4, 13, 14 and 20. A hole is bored in the front wall of the base casting of the meter at C (Fig. 20) and acts as a cylinder to hold the plug 270, which is made much longer than is usual in this type of lock (Yale). In the rear wall of the base casting two other holes are bored at D and E; (Fig. 20) the one at D being in line with the hole C in the front wall, and the E on the same plane but nearer the left hand side of the meter. This hole E is used as the cylinder for the plug 274. Covering both of these holes, and grooved and counterbored as a guide for the bolts and cam of the lock, is a plate 276. The plate 276 is fastened by screws to the inside back wall of the meter base.

The pin tumblers in the cylinder C are located well back near the center of the bore of the cylinder. A rod 270$^A$ is fastened to the inner end of the plug 270 in such a way as to form a continuation of it, making the combination virtually one piece. A flanged collar 270^B is pinned fast to rod 270^A. A square key 275 is fastened to the meter base and engages a slot cut in the flange of the collar 270^B. This key 275 prevents the collar 270^B and rod 270^A from being revolved by reason of this engagement. The rod 270^A continuing through to the back wall of the meter passes through the plate 276 and at its back end a fluted key 273 is rigidly attached. This key 273 is normally embedded in the wall of the casting within the hole at D. A cam 272 and a spur gear wheel 271 are slidably mounted on the rod 270^A, a long key way 270^D being cut in the rod 270^A and engaged by keys in the cam 272 and gear 271, so that while both cam and gear must turn with the rod, the latter can move longitudinally therethrough. This cam 272 is used to shoot the bolt 282 (Fig. 13) and is seated in a counterbored hole in the plate 276 so that while its hub will project through the hole and touch the gear 271, its body will be held by the counterbore. It is free to revolve with the rod 270^A but is prevented from moving longitudinally by the wall of the casting on one side and the bottom of the counterbore on the other. This cam 272 and gear 271 are suitably fastened together to prevent any longitudinal movement of the gear 271.

A spring 270^C is mounted on the rod 270^A and seated at the ends of the collar 270^B and the gear 271. A spur gear wheel 274^A is rigidly fastened to the inner end of the plug 274 and is meshed with the gear 271 on the rod 270^A. The pin tumblers in both cylinders at C and E are of the usual construction used in "Yale" locks and need no further description.

The other lock is mounted within the base 102 on a frame 283 having a plate 285 fastened to its front or meter end (Fig. 20). A block 284 is fastened to plate 285 and is bored in two places F and G. The hole F is in line with the hole D of the meter lock, and contains the plug 277, and the hole G is in line with the hole E of the meter lock. A spur gear 277^A (Fig. 20) is fastened to the inner end of the plug 277.

At the inner end of the frame 283 a hole H is bored in line with the hole G in the cylinder block 284. On the rear face of frame 283 is fastened a plate 289 which is grooved as a guide to the bolt 268 (Fig. 18) and drilled and counter-bored for the cam 288 which actuates the bolt 268; and the latter actuates catch 269. Other holes are drilled in the front or meter side of the turn table base in line with the holes F and G of the cylinder block 284, and still another in the rear end at K in line with holes G and H of the lock. Another plate 286 is also fastened to the lock frame 283, and is drilled in line with hole G and acts as a bearing for the spur gear 279. A rod 281 passes through holes H and K in the base 102, cam 288 and the gear 279. To the meter end of the rod 281, a fluted key 280 is rigidly fastened, and the extremity of the rod which projects through the turn table base and is accessible from the outside, is flattened to afford a grip for the hand in turning. (Figs. 3 and 20.) Two long key ways are cut in this rod 281, one for engagement of a key in the cam 288 and the other for engagement of a key in the spur gear 279, as in the case of the cam 272 and gear 271, on rod 278^A of the meter lock. A sleeve 281^A is pinned to rod 281, and has a spline cut length-wise on its surface to engage a pin 281^C fastened to the frame 283. A spring 281^B mounted on rod 281 between plate 286 and collar 281^A on the rod normally pushes rod 281 out to keep the fluted key 280 within the hole G.

The bolts of the lock are two in number and are shown in Fig. 18 which shows the plate 289 from the meter side of the machine with the other part of the lock removed. This plate 289 is fastened to the frame 283 of the lock by screws shown in the figure in section. The hub of the meter gear 106 fastened to the shaft 107 passes entirely through plate 289. The bolt 268 is rectangular in cross section except at its upper end where it is turned to cylindrical form where it passes through the base 102 and engages hole 101^C in plate 101. (This cylindrical form is preferable as it is easier to drill round holes in 102 and 101.) A sector shaped bolt 269 pivoted on a stud 269^A engages a notch 106^A cut in the hub of the meter gear 106. Teeth cut on the rim of the bolt 269 mesh with rack teeth cut on the bolt 268. The cam 288 has a tooth 288^A which engages the tooth space 268^A on bolt 268. Two stops 268^B are also cut on a bolt 268 in which the cylindrical portion of cam 288 bears holding the bolt firmly in either the up or down position. When the cam 288 is turned the bolt is shot upward so that its upper end enters the hole 101^C in plate 101 thereby preventing the head 100 from being turned. The toothed connection between 268 and 269 causes the latter to turn so that the end 269^B enters the notch 106^A of the gear wheel hub 106 thereby preventing it from being turned. Both bolts and cam are sunk into the body of the plate in counterbores and a slot, so that they can move with freedom when the plate 289 is screwed to the frame 283 of the lock. The operation of the lock has already been described.

To operate the locks a fluted key 270^X is inserted in the plug 270 at the front end of the meter. When this key 270^X is pushed home it lines up the pin tumblers and frees the plug 270 in its cylinder. It still cannot be turned however because the fixed key 275 is engaged with the slot in the rim of the collar 270ᴮ; but plug 270 can then be pushed inward. When this is done the rod 270ᴬ slides easily through the cam 272 and gear 271, and pushes the fluted key 273 out through the back of the meter into the plug 277 of the machine lock, lining up its pin tumblers and releasing it in its cylinder. Upon this inward movement of plug 270 the collar 270ᴮ, moving with the rod 270ᴬ clears the end of the square key 275, which can no longer prevent its being turned. But the gear 271 on rod 270ᴬ is meshed with gear 274ᴬ which is fastened to the plug 274, and plug 274 is locked in position in its cylinder by its pin tumblers. To clear this last obstruction it is necessary to push the rod 281, inward, towards the meter, which will cause the key 280 to enter the plug 274 and line up its pin tumblers. Both locks can now be operated by turning either one or both of the keys 270ˣ and 280. It can easily be seen from the drawings and the description that neither of the locks can be turned without this interchange of keys.

There are three bolts in the meter lock, but the three are contained in one member 282 (Fig. 13) which comprises a rectangular bar with a branch protruding from one side extending first outward and then turning upward. The main stem of this piece 282 is positioned to slide vertically in suitable grooves cut in the plate 276. The upper end of the main stem forms a bolt M adapted to engage a slot in the flanged sleeve 205ᴬ which is fastened to the cam shaft 205. The end of the branch forms a bolt N adapted to engage a slot in the flanged sleeve 204ᴬ fastened to the drive shaft 204. The lower end of the stem forms a bolt L which is adapted to project through the bottom of the meter base and engages a slot cut in the machine to receive it. (Fig. 13.) A notch cut in the side of the member 282 is adapted to be engaged by a projection on cam 272 (Fig. 20) by which the member is moved in either the up or down position by the action of the lock just described.

When the bolts 282 are in the up position bolts M and N are engaged with their respective slots in the flanges 204ᴬ and 205ᴬ and thus prevent the drive shaft 204 and cam shaft 205 from being turned; while bolt L is drawn up flush with the bottom of the meter and out of engagement with the slot in the machine. When in this position the meter can be withdrawn from the machine. but both driving and cam shafts are locked. When member 282 is in down position both bolts M and N are out of engagement with flanges 204ᴬ and 205ᴬ and both driving and cam shafts can be revolved; but the bolt L will then be protruded from the bottom of the meter, locking it in place on the machine; in which position both the drive shaft 204 and cam shaft 205 will be properly coupled to their mating shafts on the machine. The bolt L must be engaged in its proper slot in the machine because, as before shown, the meter must be placed in its position on the machine before any locking or unlocking can take place.

A hook 290 (Fig. 3) which projects from the back of the meter, Figs. 1 and 3, passes under the rim or flange 100ᶜ of the head 100 and its hook and extending up and behind the rim 100ᶜ prevents the meter from being withdrawn, except when the head 100 is indexed at the neutral position in which case a slot or opening 100ᴴ in the rim 100ᶜ will be over the hook 290 and offer no obstacle to its withdrawal. Also when head 100 is set in neutral position a hole 101ᶜ in the plate 101 will be in line with the bolt 268 of the lock, Fig. 19.

*The general driving and trip mechanism.*

Below the table 1 the driving mechanism and trip are located. The main shaft from which the motive power is transmitted to all operative parts of the machine, is the vertical shaft 39 (Fig. 3). This may be either power, or hand driven, through the horizontal drive shaft 40 and bevel gears 41 and 42. The machine illustrated is hand driven by means of a crank 43. The shaft 39 is provided with a roller clutch 44 through which it transmits motion to the die spindles, impression sector, and the meter. The trip mechanism, acts directly on the clutch, making, or breaking its connection with the shaft 39 and with the exception of the original impulse given it to start a printing operation, it works automatically.

The shaft 39 is directly in line with the printing die and has a bottom bearing in the bracket 73, Fig. 3. It extends up through the clutch, its upper end stopping about ¼ in. from the upper end of the clutch in which it has its upper bearing.

The clutch 44 (Figs. 3 and 16) may be of any suitable construction, preferably of the usual roller type having a hub or shank extending upward from its body and enclosing the upper part of shaft 39 which revolves freely within it. This hub is journaled at its upper end in a bushing in the table 1, its end being slotted to receive the tongue of an "Oldham" coupling 45 by which it is connected to the spindle 104 which operates the printer.

Directly below the table 1 on the hub of the clutch 44 is securely fastened the spur gear 71 which serves to drive the cam 13 as already described. 44ᴬ, (Figs. 16 and 25) is the tail of the clutch cage containing the clutch rollers and protrudes from the body of the clutch 44 and is adapted to be engaged by the arm 46^A of the stop lever 46. When this part 44^A is moved back, with relation to the body of the clutch it carries, the clutch rollers are out of engagement and render the clutch inoperative. A solid lug 44^B on the clutch body is designed to take up the shock of the stoppage of the clutch and relieve the comparatively light tail piece 44^A from every other duty except that of releasing the clutch rollers. The clutch body has a flange 44^C on its upper end partly cut away to form a cam adapted to be engaged by a roller on the arm 46^B of lever 46 and return it to its original position. A retaining pawl 47 engages a notch in the clutch body to prevent its rebounding from the stop 46.

The lever 46 has three arms (46^A, 46^B and 46^C) and oscillates on its stud 46^S under the action of the compression spring 50^A (Figs. 4 and 16) (through connecting parts 50, 49, and 48) and the cam 44^C. A link 48 connects arm 46^C of lever 46 with a rocking arm 49, which is connected with a rod 50 which extends horizontally through the base of the printing member and its forward end protrudes through, and into the back wall of the meter at A, Fig. 4. The rear end of rod 50 protrudes from the rear wall of the base of the printing member (Fig. 4) and is connected by a pin to the rocking arm 49 whose outer end projects upward, through a hole in the table, to receive it. Connected to this rod 50, within the body of the printing member is a spring 50^A (Fig. 4) which continually urges the rod 50 in the direction of the meter, so that its end when permitted will be pushed into the body of the meter, but its entry, or non-entry thereinto is controlled by the shutter lever 245^A of the meter. The rod 50 is the "positive" trip and must first enter and then be withdrawn from the meter at every operation of the trip.

A lever 51 with two arms #51^A and 51^B is mounted to oscillate on a stud 51^S (Fig. 16) under the influence of a spring 51^E and the link 53; a stud 52 limiting the movement of 51 under the pull of spring 51^E. A link 53 transmits the motion of the trip lever arm 54 to the lever 51. The spring 53^A holds the hook end of the link 53 in contact with the trip arm 54.

A trip arm 54 with two arms 54^B and 54^C oscillates on its stud 54^S under the influence of the hand operated push button 64, located on an exposed part of the machine, (Figs. 1 and 2) and is returned to place by the cam 13. It is held stationary in either position by the spring 54^A.

A vertical spindle 55 is mounted in the machine as shown in Fig. 16 and upon the upper end of spindle 55 is securely fastened the drag 23 on the tape 20, Fig. 1. This spindle extends downward through the table to a position above the level of the cam 13; at this point another lever 56 is fastened to oscillate with the upper lever 23.

A rod 57 is pinned to the free end of the lever 56 and extends forward over cam 13, on the level of the link 53 and projects through a hole in the block 62, nearly touching link 53 when both are in their normal positions (i. e. when the trip arm is at rest and the lever 23 is resting on the tape 20). But when no tape is between the plates 22, or what is the same thing, when the hole in the tape is in line with the hole in the plates 22 and allowing lever 23 to project through the hole, the rod 57 is pushed forward by power of the spring 23^A, which is strong enough to overcome the pressure of spring 53^A, and pushes link 53 out, so that its hook cannot engage with the trip lever 54.

Securely fastened to the vertical spindle 59, Figs. 16 and 3, is a lever 58. Its object is to rock in such a way as to prevent the oscillation of the stop lever 46. Spring 58^A furnishes the necessary motive power. 58^B is a limiting stop for the travel of lever 58. The lever 51 under pressure of its spring 51^E is always normally positioned so as to prevent the oscillation of stop lever 46.

A flanged guide 63 is provided for the free end of the link 53, which slides between the flanges, and cam shaped end of 53 engaging the cylindrical center of the guide is forced out of engagement with the lever 54 at the proper time. The guide is made eccentric to admit of adjustment. The spring 50^A on the positive trip rod 50 is the only force tending to oscillate the clutch stop lever 46, consequently if this spring is prevented from acting by obstructing the forward movement of the rod 50, the stop 46 cannot move and the clutch can not be operated.

Another lever 60 is likewise securely fastened to the vertical spindle 59 at its upper end, which is above the table 1 and on a level with the "negative" trip rod 61 (Figs. 3, 4 and 16). The "negative" trip rod 61 (Fig. 4) passes completely through the base of the printing member, its forward end entering the hole B at the back of the meter and its rear end resting against the end of the lever 60. Like the "positive" trip rod 50, it is continually urged by its spring 61^A to enter further into the meter, but its entry is governed by the shutter lever 246^A in the meter. A small roller 61^B is mounted on the meter end of rod 61, to reduce the friction of the rod on the shutter 246^A. The lever 58 if controlled only by its spring 58^A would keep it against the stop 58^B thus preventing the clutch stop lever 46 from oscillating; and again the spring 61^A on the "negative" trip rod 61, tending always to move it away from the lever 60, would offer no obstacle to such positioning of the lever 58, if the rod 61 were not obstructed in this forward movement by shutter 246^A in the meter.

A push button 64, Figs. 1—2—16—17, is mounted on a plunger 64^A (Figs. 16 and 17), which protrudes through the table 1. A bushing 65 guides the plunger 64^A. A bell crank 67 pivoted at 66^A in the bracket 66 and normally held up by the spring 67^A, communicates the thrust of the plunger 64^A to the rod 68. A rod 68 slidably mounted in the bracket 66 and the block 62 is provided to deliver the thrust of the push button 64 to the trip lever 54, and when the lever 54 is positively returned by the cam 13, the button 64 is restored to its original position, through the medium of the bell crank 67, and the plunger 64^A. A ball 64^C under pressure of a spring 64^D, engages two depressions 64^B turned on the plunger 64^A serves to hold the plunger in either its up or down position until released either by hand pressure on the button 64 or pressure from the returning trip lever 54.

Operation.

To operate the machine, a charged meter must be locked in place. This locking in place of the meter will release the other locking devices. Pushing the button of the catch 125 will then release the rotary head 100 which can now be turned in either direction till the required denomination of die is opposite the printing sector, 4. Relaxing the pressure on 125 it will spring into its place engaging the proper notch 100^F thus holding the die shaft 112 in correct alignment with the shaft 104. By pushing the button 64 the trip will be released and turning the crank will cause the die to revolve and make an impression on the tape.

To operate the machine, the meter must be locked in its place, and it must also be charged. Locking the meter in its place automatically withdraws the bolts that release the drive shafts of both meter and printing members. And charging the meter automatically withdraws the second bolt from the meter drive shaft, opens the hole A to admit the positive rod 50, and shuts the hole B which shutter obstructs the forward motion of the negative rod 61, and consequently prevents the lever 58 from obstructing the path of the stop lever 46.

A strip of paper must also be in place and led between the guides 22 and properly clamped to the impression sector 4, in order to hold back lever 23, which when thus held withdraws the rod 57 and allows the link 53 to hook one end of the lever 54. When these conditions are complied with, the only remaining obstruction to the rocking of the stop lever 46, is the secondary stop lever 51 (Fig. 16) which is designed to be operated by hand.

The operation of the trip is as follows: Pressing the button 64, Figs. 1 and 16, causes the trip lever 54 to rock to the position shown in dotted lines in Fig. 16; one of its arms 54^B engaging the hook at the end of the link 53 carries it to the right. The curved end of the link 53 bearing against the guide 63 forces it out of engagement with the end 54^B of lever 54 after it has moved a sufficient distance. It is then free to return under the pull of the spring 51^E without waiting for the return of the lever 54. This movement of link 53 causes the secondary stop lever 51, to rock on its stud 51^S to the dotted line position, where the antifriction roller at the end of its long arm 51^A no longer interferes with movement of the clutch stop lever 46. With this obstruction removed part 46 rocks on its stud by action of the spring 50^A which pushes rod 50 into the meter; drawing with it the end of the rocking arm 49 which pushes the link 48, which in turn rocks 46 to the position shown in dotted line, where the roller 46^D on one of its arms 46^B rests on the body of the clutch case where the cam 44^C is cut away to receive it.

This limits the rocking movement of 46, but it is sufficient to allow the rearward arm 46^A to be rocked clear of both the lug 44^B and the projecting tail of the roller cage 44^A. Part 44^A thus released springs forward throwing the rollers of the clutch in contact with the shaft 39 which furnishes the power and should be suitably driven.

The clutch 44 revolves with the shaft 39 and the cam 44^C passing under the roller at the end of the forward arm 46^B of stop lever 46 forces it back to its original position where its rearward arm 46^A will again obstruct the passage of the lug 44^B and roller cage projection 44^A. The spring 51^E will cause lever 51 to be returned to its original position where its long arm 51^A interferes with the oscillating motion of 46, as soon as 46 has been returned because the link 53 is no longer engaged with lever 54 as previously explained. In returning to its original position lever 46, through the link 48, and rock arm 49, withdraws the positive trip rod 50 from the meter and compresses the spring 50^A. At the completion of the revolution of the clutch the end of the high part of the cam 44^C has passed the roller 46^D on the forward arm 46^B of stop lever 46 leaving space in which it can again fall at the beginning of the next operation. The cam 13 in completing one revolution engages the roller 54^D, on end of arm 54^C of lever 54 returns the trip lever 54 to its original position where it is held by its spring 54^A. During one revolution of the clutch the cycle of operations is performed, and at the end of such revolution all parts are left as at the start.

This tripping operation may be repeated over and over again until either one of two things happens: (1) The paper strip may become exhausted; in which case lever 23 projects through the hole in plates 22 and through its connection moves rod 57 forward and pushes link 53 out of the line of contact with trip lever 54, in which case no movement of 54 can affect the trip. (2) The amount of stamps purchased and for which the meter was charged may become exhausted; in this case the meter automatically locks by closing the hole at A and opening the hole at B. Closing the hole at A prevents the rod 50 from moving forward consequently stop lever 46 cannot rock to release the clutch. Opening the hole B allows the rod 61 to move forward into the meter which releases the pressure against lever 60 allowing the lever 58 to rock in behind the rear arm of 46 and prevent it from releasing the clutch.

The drawings accompanying this description are for the printing upon strips but obviously can be readily adapted for printing upon letters, checks, tickets and the like. That is, such machines will be equipped with the same "meter" and revolving set of printers or dies and the same connections, (locks and other safeguards) between the two. The only essential difference is that one machine prints directly on the letter and the other prints on tape to be attached to bulky packages that cannot be handled by the machine.

It will be obvious that this invention is not confined to the number of printers or dies, or the denominations indicated, but can be modified or amplified as conditions might require, without departing from the basic principles of the invention.

For instance, if a stamp is desired of a larger denomination than 10¢—say 20¢ or 30¢ the tens wheel would still control the locking mechanism, but the notch or detent 226ᴮ to receive the tooth of the locking plate 232 would be increased in width to permit of a corresponding increased travel of the tens wheel, in order to complete the cycle of operation.

For instance, the lower register reads 0000.36 and the 20¢ die was in printing position, one revolution of the die would reduce the reading of the register to 0000.16 at which point the machine would lock leaving an unused balance to the credit of the user of 16¢ to apply on the next setting.

In other words, it is impossible to obtain any more stamps of any denomination, after the sum remaining has been reduced to a sum less than the amount of the stamp of the greatest denomination, regardless of what die may be in printing position at the time. Any change in the number of dies in the set would merely require a corresponding change in the position and number of stops for the racks in the meter.

If a machine was desired in which all of the stamps were of dollar denomination or greater, then there would be no units or tens wheels required (in other words no decimal point); the second wheel however would still control the locking mechanism.

For instance a machine having five dies $1, $2, $3, $5, and $10 would operate exactly the same as if the denominations were in cents, as described in the first illustration, the only difference being that the residue would be in dollars instead of cents, and for that reason there would be no necessity for the decimal point; therefore "000009" would show there was an unused balance of $9.00 instead of 9¢; the tens wheel controlling the locking mechanism the same as before.

We do not herein claim the particular paper feed and impression taking mechanism, the same forming subject matter of a divisional application case #6831, Serial No. 629,858 filed April 4, 1923.

What we claim is:

1. In mechanism of the character specified the combination with a printing mechanism having a plurality of rotatable printers of different denominations, adapted to be selectively brought to printing position and means for rotating the printer in printing position; of a registering mechanism comprising a plurality of toothed racks pivoted on a common axis, indexing stops for limiting the movement of the racks; means for operating the racks for each operation of a printer, and a set of numeral wheels operatively actuated by said racks; with means automatically operated by the adjustment of a printer to printing position to shift the stops in accordance with the denomination of the printer brought to printing position, so that only the rack corresponding to the denomination of the printer in operative position will be effectively operated for each operation of the printer.

2. In combination printing mechanism, a meter containing registering mechanism including a series of numeral wheels mounted on a common axis, and means for operating the registering mechanism once for each operation of the printing mechanism; a locking member adapted to lock the numeral wheels when they register a predetermined amount; a negative trip rod, means adapted to project the negative trip rod into the meter, a stop member in the meter adapted to normally prevent the entrance of the negative trip rod into the meter, means whereby the locking member normally holds the stop member in operative position; said locking member when it locks the numeral wheels releasing the stop member thereby permitting it to shift to position to permit entry of the negative trip rod into the meter, as and for the purpose described.

3. In combination with mechanism as set forth in claim 2, a stop member in the meter adapted to lock the register driving shaft and means whereby the locking member keeps the said stop member out of engagement with the shaft until the locking member locks the numeral wheels.

4. In combination with mechanism as set forth in claim 2, a rock shaft in the meter, a latch on said shaft adapted to engage a notch on the register driving shaft, and a second arm on said shaft engaging the locking member to normally hold the latch out of position to engage the operating shaft until the locking member locks the numeral wheels.

5. In combination printing mechanism, a meter containing registering mechanism including a series of numeral wheels mounted on a common axis, and means for operating the registering mechanism once for each operation of the printing mechanism; a locking member adapted to lock the numeral wheels when they register a predetermined amount; a positive trip rod, means to project said trip rod into the meter once for each operation of the printer; a negative trip rod, means adapted to project the negative trip rod into the meter; a stop member in the meter adapted to permit the entrance of the positive trip rod into the meter, means whereby the locking member normally keeps the stop member in position to permit entry of the positive trip rod into the meter; a second stop member in the meter adapted to normally prevent the entry of the negative rod into the meter; means whereby the locking member normally keeps the second stop member in normal position; said locking member when it locks the numeral wheels releasing the said stop members thereby permitting them to shift to positions to prevent entry of the positive trip rod and permit entry of the negative trip rod into the meter, as and for the purpose described.

6. In combination with mechanism as set forth in claim 5, a stop member in the meter adapted to lock the register driving shaft and means whereby the locking member keeps the said stop member out of engagement with the shaft until the locking member locks the numeral wheels.

7. Combination with mechanism as set forth in claim 5, a rock shaft in the meter, a latch on said shaft adapted to engage a notch on the register driving shaft, and a second arm on said shaft engaging the locking member to normally hold the latch out of position to engage the operating shaft until the locking member locks the numeral wheels.

8. In combination with printing mechanism; a meter containing registering mechanism including a series of numeral wheels mounted on a common axis; means including a register driving shaft for operating the registering mechanism; locking member adapted to lock the numeral wheels when they register a predetermined amount; a stop member in the meter adapted to lock the register driving shaft, and means whereby the locking member keeps the said stop member out of engagement with the shaft until the locking member locks the numeral wheels.

9. In combination printing mechanism; a meter containing registering mechanism including a series of numeral wheels mounted on a common axis; and means including a register driving shaft for operating the registering mechanism; and locking member adapted to lock the numeral wheels when they register a predetermined amount, a rock shaft in the meter, a latch on said shaft adapted to engage a notch on the register driving shaft, and a second arm on said shaft engaging the locking member to normally hold the latch out of position to engage the operating shaft until the locking member locks the numeral wheels.

10. In combination printing mechanism; a meter containing registering mechanism including a series of numeral wheels mounted on a common axis, and means for operating the registering mechanism once for each operation of the printing mechanism; a locking member adapted to lock the numeral wheels when they register a predetermined amount; a positive trip rod actuated by the printing mechanism and controlling the operation of the register, means to project said trip rod into the meter once for each operation of the printer; a negative trip rod controlled by the registering mechanism for arresting the operation of the printer; means normally tending to project the negative trip rod into the meter, a rock shaft in the meter having an arm adapted to normally permit entrance of the positive trip rod into the meter; means whereby the locking member normally holds said arm in position to permit the entry of the positive trip rod into the meter; a second rock shaft in the meter; an arm on said shaft adapted to normally prevent the entry of the negative trip rod into the meter; means whereby the locking member normally holds said arm in position to prevent the entry of the negative trip rod into the meter; said locking member when it locks the numeral wheels permitting them to be shifted to position to prevent entry of said positive trip rod into the meter and permit entry of said negative trip rod therein, substantially as and for the purpose described.

11. In combination with mechanism as set forth in claim 10, a stop member in the meter adapted to lock the register driving shaft and means whereby the locking member keeps the said stop member out of engagement with the shaft until the locking member locks the numeral wheels.

12. In combination with mechanism as set forth in claim 10, a rock shaft in the meter, a latch on said shaft adapted to engage a notch on the register driving shaft, and a second arm on said shaft engaging the locking member to normally hold the latch out of position to engage the operating shaft until the locking member locks the numeral wheels.

13. In combination with a meter containing registering mechanism having a driving shaft, means for locking the meter in operative position, a shaft for operating the locking means, a cam on said shaft, and locking mechanism in said meter operated by said shaft whereby when the meter is locked in position the driving shaft is simultaneously unlocked, and when the meter is unlocked to permit its removal the driving shaft is simultaneously locked, substantially as described.

14. In combination with a meter containing registering mechanism having a setting shaft, means for locking the meter in operative position, a shaft for operating the locking devices, a cam on said shaft, and locking mechanism in said meter operated by said shaft whereby when the meter is locked in position the setting shaft is simultaneously unlocked, and when the meter is unlocked preparatory to removing it from position the setting shaft is simultaneously locked, substantially as described.

15. In combination with a case containing registering mechanism having a driving shaft and a setting shaft, means for locking the case in place; a shaft for operating the locking means; a cam on said shaft, and devices in said case operated by said shaft whereby when the meter is locked in position the setting shaft and the drive shaft are simultaneously unlocked; and when the case is unlocked preparatory to removing it from position the setting shaft and the driving shaft are simultaneously locked, substantially as described.

16. In combination with printing mechanism and its support; and a meter containing registering mechanism, said meter being removable from the printing mechanism; of a lock in the meter, a lock in the printing mechanism support, and means whereby the locks can only be actuated when the meter is properly positioned relative to the printing mechanism, the meter not being removable until both locks have been operated, substantially as described.

17. In combination with a printer and its support; and registering mechanism and its support, the latter being removable from the printing mechanism support, of a lock mounted in the register support, a lock mounted in the printing mechanism support, and means whereby the lock on the printing mechanism support can only be actuated when the register support is in place and the lock on the register support can only be actuated when said support is in place, and interlocking means between the two locks, whereby both locks have to be operated before the register support can be removed.

18. In combination with printing mechanism and a coacting register mechanism mounted on suitable bases; a lock mounted in the register base, a rod for operating this lock mounted in the printer base, a lock mounted in the printing mechanism base; a rod mounted in the register base adapted to operate the lock in the printer base when the printing and registering mechanisms are properly juxtaposed; and means whereby both locks must be properly operated before the register and printing mechanism can be separated, substantially as described.

19. In combination with mechanism as set forth in claim 18, a cam on one of the rods, and a slidable bolt operated by this cam, substantially as and for the purpose specified.

20. In combination with mechanism as set forth in claim 18, a cam on one of the rods, a slidable bolt operated by this cam, and a second bolt operatively actuated by the first bolt, substantially as and for the purpose specified.

21. In combination with mechanism as set forth in claim 18, a cam on each rod, a locking bolt in the register adapted to be operated by a cam on the rod in the meter, and a locking bolt in the printing mechanism adapted to be operated by the cam on the rod in the printing mechanism base.

22. In combination, printing mechanism mounted on a base, a meter containing registering mechanism adapted to be removably supported adjacent the printing mechanism, a rotary lock mounted in the meter base, a key rod for operating said lock mounted in the printing mechanism base; a rotary lock mounted in the printing mechanism base parallel with the said key rod; a key rod mounted in the meter base adapted to operate the tumbler lock in the printing mechanism base when the printing mechanism and meter are properly juxtaposed; and gearing between one of said locks and the key rod of the other lock; whereby both locks must be operated before the meter can be separated from the printing mechanism, substantially as described.

23. In combination with mechanism as set forth in claim 22, a cam on one of the key rods, and a slidable bolt operated by said cam, substantially as and for the purpose specified.

24. In combination with mechanism as set forth in claim 22, a cam on one of the key rods, a slidable bolt operated by this cam, and a second bolt operatively actuated by the first bolt, substantially as and for the purpose specified.

25. In combination with mechanism as set forth in claim 22, a cam on each key rod, a locking bolt in the meter adapted to be operated by the cam on the key rod in the meter; and a locking bolt in the printing mechanism adapted to be operated by the cam on the key rod in the printing mechanism.

26. In mechanism of the character specified, having a plurality of rotatable printers of different denominations adapted to be selectively moved to printing position; and means whereby any one printer can be held in printing position at any operation of the machine; a registering mechanism, and means automatically controlled by the adjustment of any printer to printing position, whereby the said registering mechanism is shifted at each operation of such printer at the printing point an amount corresponding to the denomination of such printer.

27. In a machine of the character specified, having a plurality of independently rotatable printers for printing stamps of different denominations; mounted upon a rotatable support whereby any one of said printers may be brought to the printing point and the other printers simultaneously held away from the printing point; means for taking an impression from the printer at the printing point; a register; and means whereby the amount printed by any and all the printers is registered by such register.

28. In mechanism of the character specified, a printing mechanism having a plurality of rotatable printers of different denominations; a rotatable support whereby one printer may be brought to operative position and the others kept out of operative position; and a registering mechanism having a plurality of actuating members; means for controlling the operative movements of said members; and gearing automatically controlled by the adjustment of the support to bring a printer to printing position, to shift the controlling means so that only the actuating member corresponding to the denomination of the printer at the printing point is rendered effective in the register, substantially as described.

29. In mechanism of the character specified having a series of rotatable printers, a support for said series, a driving means, and means connected with each printer whereby when such printer is brought into alinement with said driving means it may be rotated thereby; a register and means controlled by said register whereby any one of said printers can be operated as desired until the predetermined amount set in said register is exhausted, whereupon further printing is automatically prevented.

30. In mechanism of the character specified, having a plurality of printers of different denominations adapted to be selectively moved to printing position; a registering mechanism for limiting the total of operations of the machine in connection with any one or all of the printers to a predetermined amount, and having a plurality of actuating members, means for controlling the operative movements of said members; and means automatically operated by the adjustment of any printer to printing position to shift the controlling means as such printer is brought to printing position so that the said registering mechanism will be shifted at each operation an amount corresponding to the denomination of the printer used at the printing point, substantially as described.

31. In combination printing mechanism including a plurality of printers, a meter containing registering mechanism including a series of numeral wheels mounted on a common axis; means for adjusting any printer to operative position, means for actuating the printers in operative positions; means for operating the registering mechanism once for each operation of the printing mechanism in accordance with the denomination of the stamp being printed; a locking member adapted to lock the numeral wheels when they register a predetermined amount; a positive trip rod adapted to be projected into the meter for each operation of any printer; a stop member in the meter adapted to prevent the entrance of said trip rod into the meter, said locking member normally holding said stop member out of operative position; said locking member releasing the said stop member when it locks the numeral wheels thereby permitting the stop member to prevent entry of the trip rod into the meter, as and for the purpose described.

32. In combination, printing mechanism including a plurality of printers, a meter containing registering mechanism including a series of numeral wheels; means for operating the registering mechanism once for each operation of the printing mechanism; a locking member adapted to lock the numeral wheels when they register a predetermined amount; a trip rod, means to project said rod into the meter once for each operation of a printer; and a stop member in the meter adapted to prevent the entrance of the positive trip rod into the meter, said locking member normally holding the said stop member out of operative position; said locking member when it locks the numeral wheels releasing the said stop member to permit it to prevent entry of the trip rod.

33. In combination, printing mechanism including a plurality of printers, a meter containing registering mechanism including a series of numeral wheels; means for operating the registering mechanism once for each operation of the printing mechanism; a locking member adapted to lock the numeral wheels when they register a predetermined amount; a trip rod, means to project said rod into the meter once for each operation of a printer; a stop member in the meter adapted to prevent the entrance of the positive trip rod into the meter; said locking member normally holding the said stop member out of operative position; said locking member when it locks the numeral wheels releasing said stop member to permit it to prevent entry of the trip rod; a rock shaft in the meter, a latch on said shaft adapted to engage a notch on the register driving shaft, and a second arm on said shaft engaging the locking member to normally hold the latch out of position to engage the operating shaft until the locking member locks the numeral wheels.

34. In a machine of the character specified, having a plurality of independently rotatable printers of different denominations, means whereby any one printer from which it is desired to take an impression may be brought to the printing point, and means for rotating the printer at the printing point to take an impression therefrom; means whereby the total amount printed by any one or all of the printers is registered; and means whereby when the total amount printed reaches a predetermined number the mechanism is automatically locked against further effective operation until reset.

35. In mechanism as set forth in claim 34, means whereby printing is automatically prevented unless the parts are in proper condition and position for printing.

36. In mechanism for the purpose specified; means for feeding to the printing means a suitable length of a strip of paper to be printed at each operation of the machine; means for printing on said strip at each operation of the printing means any one of various denominations of stamps; a register for registering the total value of any and all stamps as successively printed by said means, the register being detachable from the machine; means for automatically locking the printing means against further use when a predetermined total value of stamps has been printed; and means controlled by said register whereby the printing means is rendered inoperative when the register is detached.

37. In mechanism for the purpose specified; means for printing any one of various denominations or values; means for registering in units of currency the total value amount of successive impressions made; and means controlled by the registering means for automatically locking the printing means against further use when a predetermined value amount has been printed.

38. In mechanism as described in claim 37; the registering means being detachable from the machine.

39. In mechanism as described in claim 37; the registering means being detachable from the machine, and means whereby the machine is rendered inoperative when the registering means is detached.

40. In mechanism as described in claim 37; means for feeding a strip of suitable paper to be printed at each operation of the machine.

In testimony that we claim the foregoing as our own we affix our signatures.

ARTHUR H. PITNEY.
JACOB W. OGDEN.